United States Patent
Oh et al.

(10) Patent No.: US 11,039,430 B2
(45) Date of Patent: Jun. 15, 2021

(54) METHOD AND DEVICE FOR SETTING CONTROL AND DATA CHANNEL TRANSMISSION TIME IN WIRELESS COMMUNICATION SYSTEM

(71) Applicant: Samsung Electronics Co., Ltd., Suwon-si (KR)

(72) Inventors: Jinyoung Oh, Seoul (KR); Jeongho Yeo, Hwaseong-si (KR); Sungjin Park, Incheon (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/496,671

(22) PCT Filed: Mar. 23, 2018

(86) PCT No.: PCT/KR2018/003444
§ 371 (c)(1),
(2) Date: Sep. 23, 2019

(87) PCT Pub. No.: WO2018/174639
PCT Pub. Date: Sep. 27, 2018

(65) Prior Publication Data
US 2020/0037292 A1 Jan. 30, 2020

(30) Foreign Application Priority Data
Mar. 23, 2017 (KR) .......... 10-2017-0036966

(51) Int. Cl.
*H04W 72/04* (2009.01)
*H04W 72/12* (2009.01)

(52) U.S. Cl.
CPC ..... *H04W 72/042* (2013.01); *H04W 72/1268* (2013.01); *H04W 72/044* (2013.01)

(58) Field of Classification Search
CPC .......... H04W 72/042; H04W 72/1268; H04W 72/044; H04W 72/0446; H04W 72/12;
(Continued)

(56) References Cited

U.S. PATENT DOCUMENTS

2016/0295584 A1* 10/2016 Chen ................ H04L 5/0053
2017/0142743 A1 5/2017 Yoon et al.
(Continued)

FOREIGN PATENT DOCUMENTS

| KR | 10-2016-0121406 A | 10/2016 |
| KR | 10-2016-0134475 A | 11/2016 |
| WO | 2017030486 A1 | 2/2017 |

OTHER PUBLICATIONS

International Search Report and Written Opinion regarding Application No. PCT/KR2018/003444, dated Jun. 20, 2018, 15 pages.
(Continued)

*Primary Examiner* — Jung Liu

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security and safety-related services, and the like) on the basis of 5G communication technology and IoT-related technology.

12 Claims, 11 Drawing Sheets

(58) Field of Classification Search
CPC ........... H04W 72/1289; H04W 56/003; H04W 56/001; Y02D 70/00; Y02D 70/12; Y02D 72/1289; Y02D 70/10; Y02D 70/126; H04L 1/1819; H04L 5/0053; H04L 5/0092; H04L 5/0055; H04L 5/0007
See application file for complete search history.

(56) References Cited

U.S. PATENT DOCUMENTS

| | | |
|---|---|---|
| 2017/0196020 A1 | 7/2017 | Mukherjee et al. |
| 2018/0124749 A1 | 5/2018 | Park et al. |
| 2018/0242317 A1* | 8/2018 | Marinier ........... H04W 72/0446 |
| 2019/0223204 A1* | 7/2019 | Kim ........................ H04B 1/00 |

OTHER PUBLICATIONS

Huawei et al., "Discussion on UL sTTI length and structure", 3GPP TSG RAN WG1 Meeting #87, R1-1611155, Nov. 2016, 5 pages.
Huawei et al., "UL LBT to enable UE multiplexing of uplink transmissions", 3GPP TSG RAN WG1 Meeting #84, R1-160280, Feb. 2016, 6 pages.

* cited by examiner

METHOD AND DEVICE FOR SETTING CONTROL AND DATA CHANNEL TRANSMISSION TIME IN WIRELESS COMMUNICATION SYSTEM

CROSS-REFERENCE TO RELATED APPLICATIONS

This application is a 371 National Stage of International Application No. PCT/KR2018/003444 filed Mar. 23, 2018, which claims priority to Korean Patent Application No. 10-2017-0036966 filed Mar. 23, 2017, the disclosures of which are herein incorporated by reference in their entirety.

BACKGROUND

1. Field

The disclosure relates to a wireless communication system, and more particularly, to a method and apparatus for smoothly providing a service in a communication system. Particularly, the disclosure relates to a method and apparatus for determining an uplink transmission start point and a transmission interval length in a communication system.

2. Description of Related Art

In order to meet wireless data traffic demands that have increased after the commercialization of the 4G communication system, efforts to develop an improved 5G communication system or a pre-5G communication system have been made. For this reason, the 5G communication system or the pre-5G communication system is called a beyond 4G network communication system or a post LTE system.

In order to achieve a high data transmission rate, implementation of the 5G communication system in a ultra-high frequency (mmWave) band (e.g., 60 GHz band) is being considered. In the 5G communication system, technologies such as beamforming, massive MIMO, full dimensional MIMO (FD-MIMO), array antenna, analog beam-forming, and large scale antenna are being discussed, in order to mitigate a propagation path loss in the ultra-high frequency band and increase a propagation transmission distance.

Further, in the 5G communication system, technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation have been developed to improve the system network.

In addition, in the 5G system, advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA) have been developed.

The Internet has been evolved from a human-oriented connection network in which humans generate and consume information, to an Internet of Things (IoT) network in which distributed components such as objects exchange and process information. An Internet of Everything (IoE) technology in which a big data processing technology via a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, via collection and analysis of data generated in connected objects, an intelligent Internet technology (IT) service to create new value for peoples' lives may be provided. The IoT may be applied to fields such as those of a smart home, a smart building, a smart city, a smart car, a connected car, a smart grid, health care, a smart home appliance, or high-tech medical services via the convergence of the conventional Information technology (IT) and various industries.

Accordingly, various attempts to apply the 5G communication to the IoT network are made. For example, 5G technologies such as a sensor network, machine to machine (M2M), machine type communication (MTC), and the like have been implemented by the beamforming scheme, the MIMO scheme, the array antenna scheme, and the like. The application of a cloud RAN as the big data processing technology may be an example of convergence of the 5G technology and the IoT technology.

Recently, operations of a user equipment (UE) and an evolved NodeB (eNB) performed in a communication environment where transmission or reception is performed in a shortened TTI in order to reduce delay of packet transmission, are being discussed. Accordingly, the necessity of applying a shortened TTI in a communication system that uses an unlicensed band has been increased. There is a desire for a method for overcoming the same.

SUMMARY

Therefore, the disclosure has been made in view of the above-mentioned problems, and an aspect of the disclosure is to provide a method and apparatus for providing different types of services in parallel. Another aspect of the disclosure is to provide a method and apparatus for effectively providing different types of services within the same time interval by receiving information suitable for the feature of each service when different types of services are provided in parallel.

One of the important criteria for determining the performance of a cellular wireless communication system is a packet data latency. To this end, in the LTE system, a signal is transmitted or received in units of subframes, each subframe having a transmission time interval (TTI) of 1 ms. In the LTE system that operates as described above, a user equipment (UE) (a shortened-TTI/shorter-TTI UE) that has a transmission time interval shorter than 1 ms may be supported. It is expected that the shortened-TTI UE is suitable for a service that takes latency as an important factor, such as a voice over LTE (VoLTE) service, a remote control service. Also, it is expected that the shortened-TTI UE is a device capable of implementing mission critical Internet of Things (IoT) based on cellular.

In the LTE and LTE-A system, an eNB and a UE are designed to perform transmission or reception in units of subframes, each subframe having a transmission time interval of 1 ms. In order to support a shortened-TTI UE that operates based on a transmission time interval shorter than 1 ms in an environment including an eNB and a UE that perform operation based on a transmission time interval of 1 ms, a transmission or reception operation distinct from a normal LTE and LTE-A UE needs to be defined. Therefore, the disclosure may provide a detailed method of operating a normal LTE and LTE-A UE and a shortened-TTI UE together in the same system.

The disclosure relates to a transmission or reception method which uses a transmission time interval shorter than 1 ms, the transmission time interval of the legacy LTE system, and apparatus therefor, but the disclosure may be applicable to an LTE system, a 5G/NR system, and the like.

In accordance with an aspect of the disclosure, a method of a user equipment (UE) may include: receiving downlink control information including uplink scheduling information from an evolved NodeB (eNB); determining a state point and a time interval of uplink transmission, based on the uplink scheduling information; and transmitting an uplink signal to the eNB from the start point during the time interval, wherein the start point and the time interval indicate a part of a start or a part of an end of a subframe that the UE occupies in an unlicensed band.

In accordance with another aspect of the disclosure, a user equipment (UE) may include: a transceiver configured to transmit and receive a signal; and a controller configured to receive downlink control information including uplink scheduling information from an evolved NodeB (eNB), to determine a start point and a time interval of uplink transmission, based on the uplink scheduling information, and to transmit an uplink signal to the eNB from the start point during the time interval, wherein the start point and the time interval indicate a part of a start or a part of an end of a subframe that the UE occupies in an unlicensed band.

In accordance with another aspect of the disclosure, a method of an evolved NodeB (eNB) may include: transmitting downlink control information including uplink scheduling information to a user equipment (UE); and receiving an uplink signal from the UE from a start point determined based on the uplink scheduling information during a time interval determined based on the uplink scheduling information, wherein the start point and the time interval indicate a part of a start or a part of an end of a subframe that the UE occupies in an unlicensed band.

In accordance with another aspect of the disclosure, an evolved NodeB (eNB) may include: a transceiver configured to transmit and receive a signal; and a controller configured to transmit downlink control information including uplink scheduling information to a user equipment (UE), and to receive an uplink signal from the UE from a start point determined based on the uplink scheduling information during a time interval determined based on the uplink scheduling information, wherein the start point and the time interval indicate a part of a start or a part of an end of a subframe that the UE occupies in an unlicensed band.

According to an embodiment of the disclosure, data may be effectively transmitted using different types of services in a communication system. Also, according to an embodiment of the disclosure, provided is a method that enables data transmission between the same or different types of services to coexist, so that requirements of each service may be satisfied, the delay of a transmission time may be reduced, or at least one of frequency-time and space resources, and transmission power may be effectively used.

Another embodiment of the disclosure provides an operation method of reducing a delay by performing transmission or reception using a short transmission time interval when a UE and an eNB performs transmission or reception, so that the operations of the eNB and the UE can be effectively performed and the delay of transmission time can be reduced.

DETAILED DESCRIPTION

Figure 1:
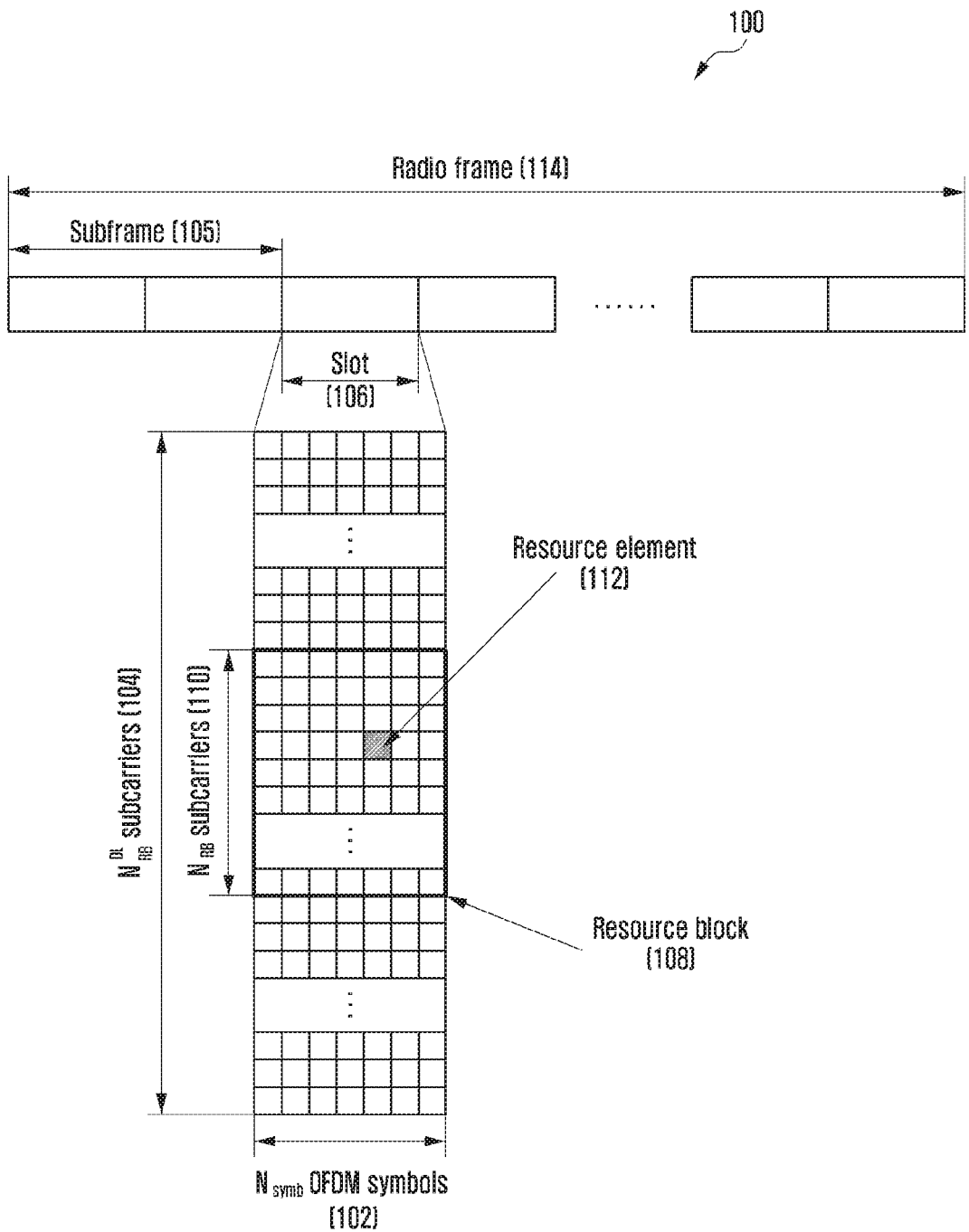
FIG. 1 is a diagram illustrating a basic structure of a time-frequency domain which is a radio resource area via which a control channel or data is transmitted in a downlink in an LTE system or a system similar thereto.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, '~unit' may include one or more processors.

A wireless communication system has been developed to be a broadband wireless communication system that provides a high speed and high quality packet data service, like the communication standards, for example, high speed packet access (HSPA) of 1gPP, long term evolution (LTE) or evolved universal terrestrial radio access (E-UTRA), LTE-advanced (LTE-A), high rate packet data (HRPD) of 1gPP2, ultra mobile broadband (UMB), and 802.16e of IEEE, or the like, beyond the voice-based service provided at the initial stage. Also, communication standard of 5G or new radio (NR) is being developed as a 5G wireless communication system.

In the wireless communication system including the 5G, at least one service from among enhanced mobile broadband (eMBB), massive machine type communications (mMTC) and ultra-reliable and low-latency communications (URLLC) may be provided to a user equipment (UE). In this instance, the services may be provided to the same UE during the same time interval. In all embodiments of the disclosure, eMBB may be a service for high-speed transmission of high-capacity data. mMTC may be a service for minimizing the power of a UE, and for supporting multiple UE access. URLLC may be a service for high reliability and low latency. However, the disclosure is not limited thereto. Also, in all embodiments of the disclosure, it is assumed that a URLLC service transmission time is shorter than an eMBB and mMTC service transmission time. However, the disclosure is not limited thereto. The three services are the main scenarios in the LTE system or a system after LTE, such as 5G/NR (new radio or next radio) or the like.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be changed according to users, intentions of the users, or customs. Therefore, the definitions of the terms should be made based on the contents throughout the specification. Hereinafter, an evolved NodeB (eNB) is a subject, which configures a part or the entirety of control information for a user equipment (UE) and performs resource allocation, and may be at least one of an eNode B, a Node B, a base station (BS), a radio access unit, a base station controller, a transmission and reception point (TRP), or a node on a network. A user equipment (UE) may include a UE, a mobile station (MS), a cellular phone, a smart phone, a computer, or a multimedia system capable of performing a communication function.

In the disclosure, a downlink (DL) is a wireless transmission path of a signal that an eNB transmits to a UE. An uplink is a wireless transmission path of a signal that a UE transmits to an eNB. Also, although an embodiment of the disclosure is described with reference to an LTE or LTE-A system, the embodiment of the disclosure may be applicable to other communication systems having a similar technical background or a similar channel. For example, the 5G mobile communication technology (5G, new ratio, or NR) developed after LTE-A may be included. Also, an embodiment of the disclosure may be modified by those skilled in the art without departing from the scope of the disclosure, and may be applied to other communication systems.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink indicates a wireless link via which a UE (a terminal or user equipment (UE)) or a mobile station (MS) transmits data or a control signal to an eNB (an eNode B or base station (BS)). The downlink indicates a wireless link via which an eNB transmits data or a control signal to a UE. In the multiple access schemes as described above, time-frequency resources for carrying data or control information are allocated and operated in a manner to prevent overlapping of the resources, that is, to establish the orthogonality, between users, so as to identify data or control information of each user.

The LTE system employs hybrid automatic repeat reQuest (HARQ) that retransmits corresponding data in a physical layer when decoding fails at the initial transmission. The HARQ scheme refers to a scheme that enables a receiver to transmit, to a transmitter, information (negative acknowledgement (NACK)) indicating the failure of decoding when the receiver does not successfully decode data, so that the transmitter retransmits the corresponding data in a physical layer. The receiver may combine data retransmitted from the transmitter and previous data, decoding of which fails, whereby data reception performance may increase. Also, when the receiver accurately decodes data, the receiver transmits, to the transmitter, information (acknowledgement (ACK)) reporting that decoding is successfully executed, so that the transmitter transmits new data.

FIG. 1 is a diagram illustrating a basic structure of a time-frequency domain which is a radio resource area via which a control channel or data is transmitted in a downlink in an LTE system or a system similar thereto.

Referring to FIG. 1, the horizontal axis indicates the time domain. The vertical axis indicates the frequency domain. In the time domain, the minimum transmission unit is an OFDM symbol. One slot 106 includes $N_{symb}$ OFDM symbols 102, and one subframe 105 includes two slots. The length of one slot is 0.5 ms, and the length of one subframe is 1.0 ms. A radio frame 114 is a time domain interval including 10 subframes. In the frequency domain, the minimum transmission unit is a subcarrier. The entire system transmission bandwidth may include a total of $N_{BW}$ subcarriers 104. In this instance, a detailed numeral value may be variable.

In the time-frequency domain, the basic resource unit is a resource element (RE) 112, and an RE is expressed by an OFDM symbol index and a subcarrier index. A resource block (RB) (or a physical resource block (PRB)) 108 is defined by $N_{symb}$ consecutive OFDM symbols 102 in the time domain and $N_{RB}$ consecutive subcarriers 110 in the frequency domain. Therefore, in one slot, a single RB 108 may include $N_{symb} \times N_{RB}$ REs 112. Normally, the minimum allocation unit for data in the frequency domain is the RB. In the LTE system, $N_{symb}=7$ and $N_{RB}=12$, $N_{BW}$ and $N_{RB}$ may be proportional to the bandwidth of a system transmission band. The data rate may increase in proportion to the number of RBs scheduled for a UE. The LTE system may define and operate 6 transmission bandwidths. In the case of a FDD system that operates a downlink and an uplink, based on frequency, a downlink transmission bandwidth and an uplink transmission bandwidth may be different from each other. A channel bandwidth may indicate an RF bandwidth corresponding to a system transmission bandwidth. Table 1 provided below indicates a relationship between a system transmission bandwidth and a channel bandwidth defined in the LTE system. For example, in the LTE system having a channel bandwidth of 10 MHz, a transmission bandwidth may include 50 RBs.

TABLE 1

| | Channel bandwidthBW$_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within first N OFDM symbols included in the subframe. Generally, N={1, 2, 3} in an embodiment. Therefore, N applied to each subframe may vary depending on the amount of control information to be transmitted on the current subframe. The transmitted control information may include a control channel transmission interval indicator indicating how many OFDM symbols are used when the control information is transmitted, scheduling information associated with downlink data or uplink data, and information associated with HARQ ACK/NACK.

In the LTE system, scheduling information associated with downlink data or uplink data may be transmitted from an eNB to a UE via downlink control information (DCI). DCI is defined according to various formats. Depending on each format, the DCI indicates whether scheduling information is scheduling information (UL grant) for uplink data or scheduling information (DL grant) for downlink data, whether the size of control information is small compact DCI, whether spatial multiplexing using multiple antennas is applied, whether DCI is for the purpose of power control, or the like. For example, DCI format 1 which is the scheduling control information (DL grant) for downlink data may include one of the following pieces of control information.

Resource allocation type 0/1 flag: indicates whether a resource allocation scheme is type 0 or type 1. Type 0 applies a bitmap scheme and allocates resources in units of resource block groups (RBGs). In the LTE system, a basic scheduling unit is an RB expressed by time and frequency domain resources, and an RBG includes a plurality of RBs and is used as a basic scheduling unit in the type 0 scheme. Type 1 allows allocation of a predetermined RB in an RBG.

Resource block assignment: indicates an RB allocated for data transmission. An expressed resource is determined according to the system bandwidth and resource allocation scheme.

Modulation and coding scheme (MCS): indicates a modulation scheme used for data transmission and the size of a transport block, which is data to be transmitted.

HARQ process number: indicates the process number of HARQ.

New data indicator: indicates whether it is HARQ initial transmission or HARQ retransmission.

Redundancy version: indicates the redundancy version of HARQ.

Transmit power control (TPC) command for physical uplink control channel (PUCCH): indicates a transmission power control command for a PUCCH which is an uplink control channel.

The DCI may pass through a channel coding and modulation process, and may be transmitted via a physical downlink control channel (PDCCH) (or control information, hereinafter, they are interchangeably used) or an enhanced PDCCH (EPDCCH) (or improved control information, hereinafter, they are interchangeably used).

Generally, the DCI is scrambled with a predetermined radio network temporary identifier (RNTI) (or a UE identifier), independently for each UE, a cyclic redundancy check (CRC) is added, and channel coding is performed, whereby each independent PDCCH is configured and transmitted. In the time domain, a PDCCH is mapped and transmitted during the control channel transmission interval. The location where a PDCCH is mapped in the frequency domain, may be determined based on the identifier (ID) of each UE, and may be transmitted over the entire system transmission band.

Downlink data may be transmitted via a physical downlink shared channel which is a physical channel for downlink data transmission. The PDSCH may be transmitted after the control channel transmission interval. The scheduling information such as a detailed mapping location in the frequency domain, a modulation scheme, and the like may be determined based on DCI transmitted via the PDCCH.

Via an MCS in the control information included in the DCI, an eNB may report the modulation scheme applied to a PDSCH to be transmitted to a UE, and the size (transport block size (TBS)) of data to be transmitted. In an embodiment, the MCS may include 5 bits, or may include more or fewer bits than 5 bits. The TBS corresponds to a size before channel coding for error correction is applied to data (transport block (TB)) that the eNB desires to transmit.

The modulation scheme supported by the LTE system includes quadrature phase shift keying (QPSK), 16 quadrature amplitude modulation (16QAM), and 64QAM. Modulation orders ($Q_m$) thereof correspond to 2, 4, and 6, respectively. That is, in the case of the QPSK modulation, 2 bits are transmitted per symbol. In the case of the 16QAM modulation, 4 bits are transmitted per symbol. In the case of 64QAM modulation, 6 bits are transmitted per symbol. Also, a modulation scheme beyond 256QAM may be used according to system deformation.

Figure 2:
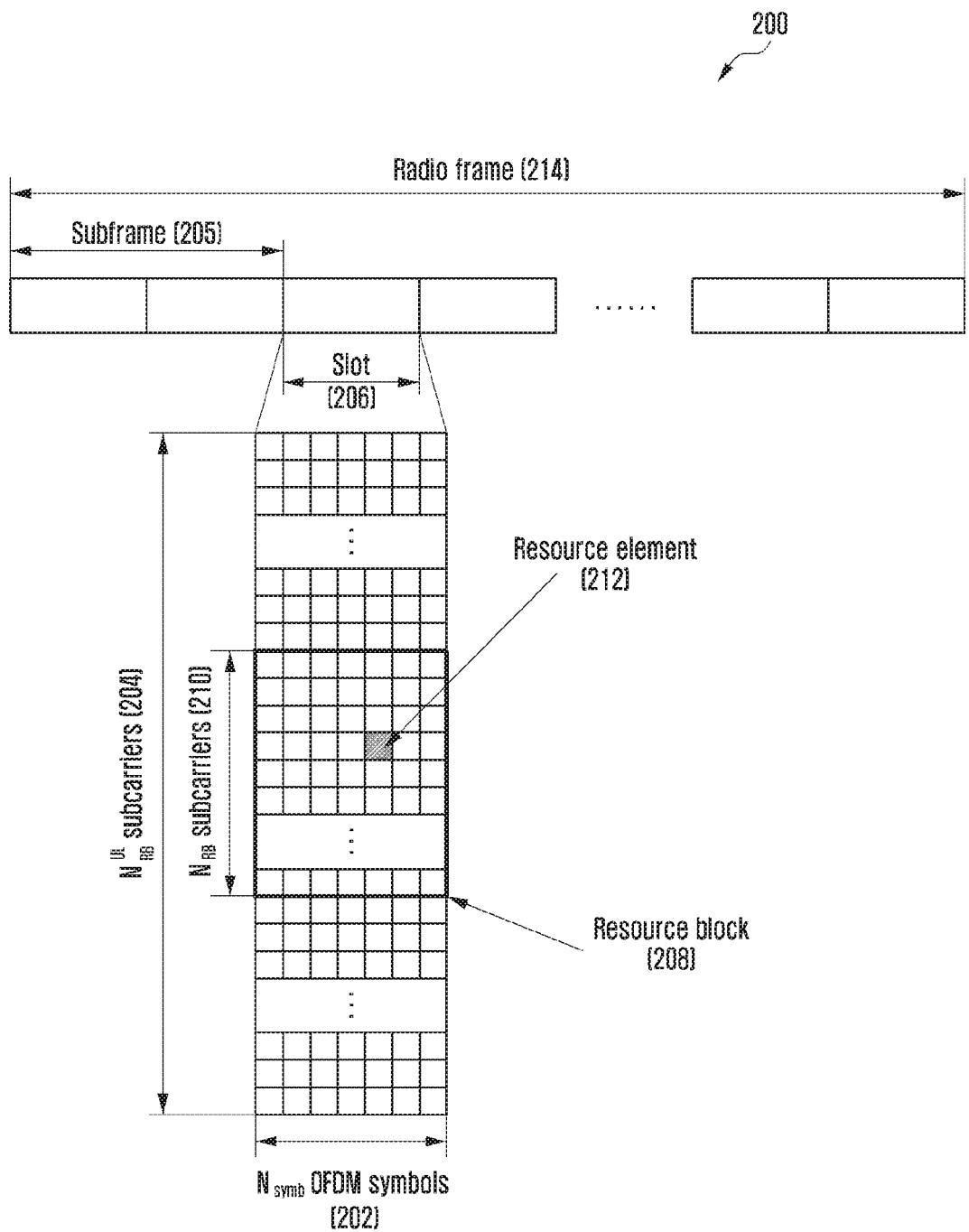
FIG. 2 is a diagram illustrating a basic structure of a time-frequency domain which is a radio resource area via which a control channel or data is transmitted in an uplink in an LTE-A system.

FIG. 2 is a diagram illustrating a basic structure of a time-frequency domain which is a radio resource area via which a control channel or data is transmitted in an uplink in an LTE-A system.

Referring to FIG. 2, the horizontal axis indicates the time domain, and the vertical axis indicates the frequency domain. The minimum transmission unit in the time domain is an SC-FDMA symbol 202, and a single slot 206 may include $N_{symb}^{UL}$ SC-FDMA symbols. A single subframe 205 includes two slots. The minimum transmission unit in the frequency domain is a sub-carrier and the entire system transmission band 204 includes a total of $N_{BW}$ subcarriers. $N_{BW}$ may have a value that is proportional to a system transmission band.

In the time-frequency domain, the basic resource unit is a resource element (RE) 212, and an RE is defined by an SC-FDMA symbol index and a subcarrier index. A resource block pair (RB pair) 208 may be defined by $N_{symb}^{UL}$ consecutive SC-FDMA symbols in the time domain and $N_{sc}^{RB}$ consecutive subcarriers in the frequency domain. Accordingly, a single RB includes $N_{symb}^{DL} \times N_{SC}^{RB}$ REs. In general, the minimum transmission unit of data or control information is an RB. A PUCCH may be mapped to a frequency domain corresponding to 1 RB, and may be transmitted during one subframe.

In the LTE system, the timing relationship of a PUCCH or a PUSCH may be defined, the PUCCH or PUSCH being an uplink physical channel which delivers an HARQ ACK/NACK with respect to a PDCCH/EPDCCH including a semi-persistent scheduling release (SPS release) or a PDSCH which is a downlink data transmission physical channel. For example, in the LTE system operating according to frequency division duplex (FDD), an HARQ ACK/NACK with respect to a PDCCH or EPDDCH including SPS release or a PDSCH transmitted in subframe (n−4) is transmitted via a PUCCH or a PUSCH in subframe n.

In the LTE system, a downlink HARQ employs an asynchronous HARQ scheme in which a data retransmission point is not fixed. That is, when an eNB receives, from a UE as a feedback, a HARQ NACK with respect to initial transmission data transmitted by the eNB, the eNB may freely determine the transmission point of retransmission data via a scheduling operation. For the HARQ operation, the UE performs buffering of data, which is determined to have an error according to the result of decoding reception data, and may combine the buffered data and the retransmission data.

When the UE receives a PDSCH including downlink data transmitted from the eNB in subframe n, the UE transmits, to the eNB, uplink control information including a HARQ ACK or NACK with respect to the downlink data via a PUCCH or a PUSCH in subframe (n+k). In this instance, k is defined differently according to FDD or time division duplex (TDD) of the LTE system, and a subframe configuration thereof. For example, in the case of the FDD LTE system, k is fixed to 4. In the case of the TDD LTE system, k may be changed according to a subframe configuration and a subframe number. Also, in the case of data transmission via a plurality of carriers, k to be applied may vary depending on the TDD configuration of each carrier.

In the LTE system, the uplink HARQ employs a synchronous HARQ scheme in which a data transmission point is fixed, unlike the downlink HARQ. That is, the uplink/downlink timing relation of a physical uplink shared channel (PUSCH), which is a physical channel for uplink data transmission, a PDCCH which is a downlink control channel preceding the PUSCH, and a physical hybrid indicator channel (PHICH) which is a physical channel for transmission of a downlink HARQ ACK/NACK with respect to the PUSCH, may be transmitted or received according to the rule as follows.

When receiving a PHICH for transmission of a downlink HARQ ACK/NACK or a PDCCH including uplink scheduling control information transmitted from an eNB in subframe n, a UE transmits uplink data corresponding to the control information via a PUSCH in sub-frame (n+k). In this instance, k is defined differently according to FDD or time division duplex (TDD) of the LTE system, and a configuration thereof. For example, in the case of the FDD LTE system, k is fixed to 4. In the case of the TDD LTE system, k may be changed according to a subframe configuration and a subframe number. Also, in the case of data transmission via a plurality of carriers, k to be applied may vary depending on the TDD configuration of each carrier.

When the UE receives a PHICH including information related to a downlink HARQ ACK/NACK from the eNB in subframe i, the PHICH may correspond to a PUSCH that the UE transmits in subframe i−k. In this instance, k is defined differently according to FDD or TDD of the LTE system, and a configuration thereof. For example, in the case of the FDD LTE system, k is fixed to 4. In the case of the TDD LTE system, k may be changed according to a subframe configuration and a subframe number. Also, in the case of data transmission via a plurality of carriers, k to be applied may vary depending on the TDD configuration of each carrier.

The wireless communication system has been described with reference to an LTE system, but the disclosure is not limited to the LTE system and may be applicable to various wireless communication systems such as NR, 5G, or the like. Also, if the embodiment is applied to other wireless communication systems, k may be changed and applied to a system that uses a modulation scheme corresponding to FDD.

Figure 3:
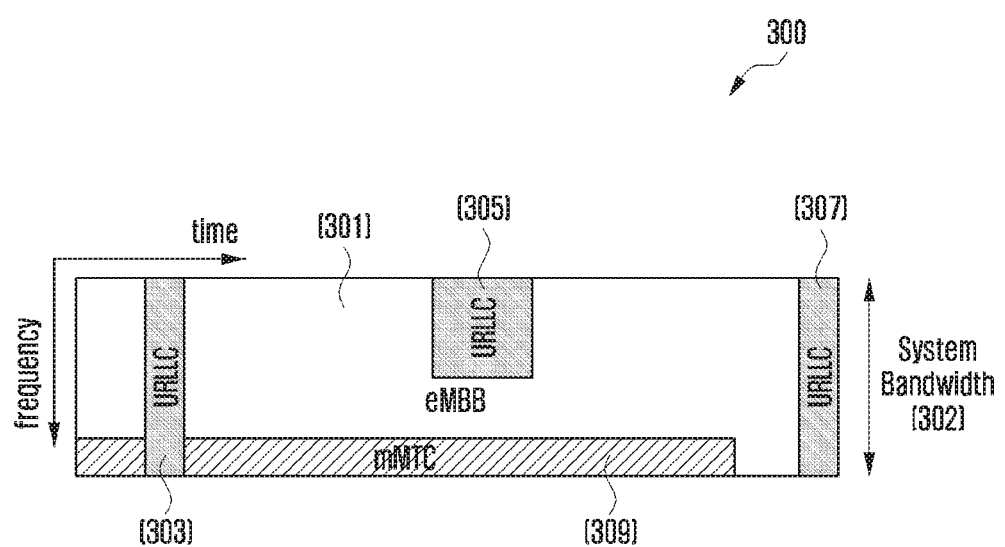
FIG. 3 is a diagram illustrating that data for eMBB, URLLC, and mMTC, which are services considered in 5G or NR systems, are allocated in the frequency-time resources.
Figure 4:
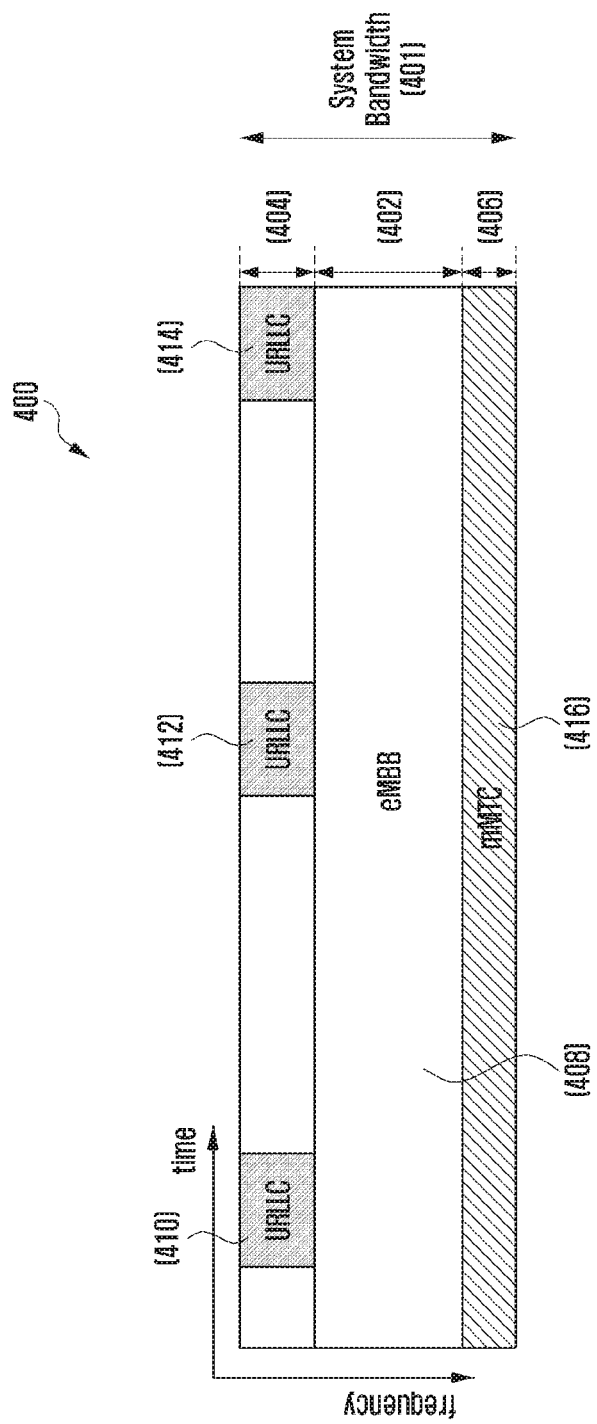
FIG. 4 is a diagram illustrating that data for eMBB, URLLC, and mMTC, which are services considered in 5G or NR systems, are allocated to be orthogonal in the frequency-time resources.

FIGS. 3 and 4 are diagrams illustrating that data for eMBB, URLLC, and mMTC, which are services considered in 5G or NR systems, are allocated in the frequency-time resources.

Referring to FIGS. 3 and 4, there is provided a scheme of allocating frequency and time resources for transmitting information in each system.

FIG. 3 illustrates that data for eMBB, URLLC, mMTC has been allocated in the entire system frequency band 300. If URLLC data 303, 305, and 307 is generated and needs to be transmitted, while eMBB 301 and mMTC 309 are allocated and transmitted in a predetermined frequency band, eMBB 301 and mMTC 309 may empty previously allocated parts or may not perform transmission, so that the URLLC data 303, 305, and 307 may be transmitted. Among the services, URLLC needs to reduce latency, and thus, the URLLC data 303, 305, and 307 may be allocated to a part of the resource 301 where eMBB is allocated, and may be transmitted. If URLLC is additionally allocated and transmitted in the resource to which eMBB is allocated, eMBB data may not be transmitted in the overlapping frequency-time resources. Accordingly, the performance of transmission of the eMBB data may be decreased. In this instance, the transmission of the eMBB data may fail due to the allocation of URLLC.

In FIG. 4, the entire system frequency band 400 may be divided, and each sub-band 402, 404, and 406 may be used for transmitting a service and data. Information related to configuration of the sub-bands may be determined in advance, and the information may be transmitted from an eNB to a UE via higher signaling. Alternatively, an eNB or a network node may arbitrarily determine the information related to the sub-bands and provide services without separately transmitting sub-band configuration information to a UE. FIG. 4 illustrates that the sub-band 402 is used for transmission of eMBB data, the sub-band 404 is used for transmission f URCCL data, and the sub-band 406 is used for transmission of mMTC data.

In an embodiment, a description will be provided under the assumption that the length of a transmission time interval (TTI) used for transmission of URLLC is shorter than the length of a TTI used for the transmission of eMBB or mMTC. However, the case in which the length of the TTI for transmission of URLLC is identical to the length of the TTI used for transmission of eMBB or mMTC may also be applicable. Also, a response to information related to URLLC may be transmitted earlier than a response time related to eMBB or mMTC, and thus, information may be transmitted or received with low latency.

Hereinafter, an eMBB service is referred to as a first type service. Data for eMBB is referred to as first type data. Control information for eMBB is referred to as first type control information. The first type service, the first type control information, or first type data is not limited to eMBB, and may also be applicable when at least one of high-speed data transmission or broadband transmission is required. Also, an URLLC service is referred to as a second type service. Control information for URLLC is referred to as second type control information. Data for URLLC is referred to as second type data. The second type service, the second type control information, or the second type data are not limited to URLLC, and may also be applicable to another service or system that requires at least one from among the case that requires low latency, the case that requires high-reliability transmission, or the case that requires both low latency and high-reliability. Also, an mMTC service is referred to as a third type service. Control information for mMTC is referred to as third type control information. Data for mMTC is referred to as third type data. The third type service, the third type control information, or the third type data are not limited to mMTC, and may also be applicable when at least one of low-speed or wide coverage, low-power, intermittent data transmission, small-size data transmission, or the like is required. Also, in the description of an embodiment, it is understood that the first type service may or may not include the third type service.

In order to transmit at least one of the three types of services, control information, or data, the structure of a physical layer channel used for each service type may be different. For example, at least one of the length of a transmission time interval (TTI), a unit of allocation of a frequency or time resource, the structure of a control channel, and a data mapping method may be different. In this instance, although the three types of different services, control information, and data have been described, there are more different types of services, control information, and data. In this instance, the disclosure may be applicable. Also, a description of embodiments of the disclosure does not distinguish control information and data for a service and is provided by regarding that the control information is included in the data for service, without departing from the scope of the disclosure according to the determination by those skilled in the art.

In order to describe a method and apparatus proposed in the embodiments, the terms, a "physical channel" and a "signal" used in the legacy LTE or LTE-A system may be used. However, the disclosure may be applicable to a wireless communication system different from the LTE and LTE-A system.

As described above, the embodiment defines transmission or reception performed between a UE and an eNB for the first type, second type, or third type service or data transmission, and provides a detailed method of operating UEs, for which different types of services, control information, or data are scheduled, in the same system. In the disclosure, a first type UE, a second type UE, and a third type UE indicate a UE for which the first type service or data is scheduled, a UE for which the second type service or data is scheduled, and a UE for which the third type service or data is scheduled, respectively. In the embodiment, the first type UE, the second type UE, and the third type UE are the same UE, or may be different UEs. Also, although a UE, which supports transmission or reception of one or more service types according to the embodiment, operates at least one of the first type service, the second type service, and the third type service in the same cell or carrier, or operates each service type in different cells or carriers, the disclosure may be applicable.

According to an embodiment provided hereinafter, a UE may receive uplink transmission configuration information or uplink scheduling configuration information or UL grant delivered via a downlink control channel (e.g., PDCCH) transmitted from an eNB, and may transmit uplink information (e.g., an uplink data channel (PUSCH)) according to the received uplink transmission configuration information. This scheme is referred to as a first uplink transmission scheme. Also, a UE may transmit uplink information according to uplink transmission configuration information configured in advance, without receiving uplink transmission configuration information, uplink scheduling configuration information, or UL grant delivered via a downlink control channel (e.g., a PDCCH) transmitted from an eNB, or a UE may autonomously select at least one piece of configuration information from among uplink transmission configuration information configured in advance, and may transmit uplink information according to the uplink transmission configuration information configured in advance and the selected uplink transmission configuration information. This scheme is referred to as a second uplink transmission scheme. In the second uplink transmission scheme, the uplink transmission configuration information related to uplink transmission of initial transmission may initiate the uplink transmission based on uplink transmission configuration information, uplink scheduling configuration information, or UL grant delivered via a downlink control channel (e.g., a PDCCH) transmitted from the eNB.

At least one of an uplink scheduling configuration (uplink scheduling grant) signal and a downlink data signal is referred to as a first signal. Also, in the disclosure, at least one of an uplink data signal associated with uplink scheduling configuration and a response signal (or HARQ AC/NACK signal) to a downlink data signal is referred to as a second signal. In the embodiment, among signals that an eNB transmits to a UE, a signal that requires a response from the UE is referred to as a first signal, and a response signal from the UE in response to the first signal is referred to as a second signal. Also, in the embodiment, the type of service of a first signal is at least one of eMBB, URLLC, and mMTC, and a second signal also corresponds to at least one of the services.

Hereinafter, in the embodiment, the length of a TTI of a first signal is a time value related to transmission of the first signal, and may indicate the length of a time during which the first signal is transmitted. Also, the length of a TTI of a second signal is a time value related to transmission of the second signal, and may indicate the length of a time during which the second signal is transmitted. The length of a TTI of a third signal is a time value related to transmission of the third signal, and may indicate the length of a time during which the third signal is transmitted. Also, in the disclosure, transmission or reception timing of a first signal, a second signal, or a third signal is information associated with when a UE is to transmit the first signal, the second signal, or the third signal and when an eNB is to receive the first signal, the second signal or the third signal or when the eNB is to transmit a response or feedback (e.g., ACK/NACK information) in response to the received signal. This is referred to as transmission/reception timing of the first signal, second signal, or third signal. In this instance, the first signal, the second signal, and the third signal are referred to as signals for the first type service, the second type service, and the third type service. In this instance, at least one from among the length of a TTI of the first signal, second signal, or third signal and the transmission/reception timing of the first signal, second signal, or third signal may be configured to be different. For example, the length of the TTI of the first signal is the same as the length of the TTI of the second signal, but may be configured to be longer than the length of the TTI of the third signal. As another example, the transmission/reception timing of the first signal and the second signal may be configured to be n+4, but the transmission/reception timing of the third signal may be configured to be shorter than the transmission/reception timing, for example, n+2.

Also, in the embodiment provided below, under the assumption that an eNB transmits a first signal in an $n^{th}$ TTI, and a UE transmits a second signal in an $n+k^{th}$ TTI, the fact that the eNB informs the UE of the transmission timing of the second signal may be equal to the fact that the eNB informs the UE of the value of k. Alternatively, under the assumption that an eNB transmits a first signal in an $n^{th}$ TTI and a UE transmits a second signal in an $n+t+a^{th}$ TTI, the fact that the eNB informs the UE of the transmission timing of the second signal may be equal to the fact that the eNB informs an offset value of a, based on t, which is defined in advance or is obtained according to a previously defined scheme. In this instance, t may be defined in advance as various values, in addition to t=4, and may be obtained according to a previously defined scheme.

Also, the technology proposed in the disclosure may be applicable to a new type of duplex mode (e.g., frame structure type 3) in addition to an FDD or TDD system. Hereinafter, although a description will be provided by assuming an eNB and a UE that perform communication in an unlicensed band (or an eNB and a UE that operate according to frame structure type 3), the description will be applied to an eNB and a UE that perform communication in a licensed band. Particularly, the embodiments proposed in the disclosure may be applicable to a system in which uplink and downlink transmission points of a UE and an eNB that perform communication in a licensed band may freely change depending on a time, for example, a dynamic TDD system.

Hereinafter, higher signaling in the disclosure may indicate a method of delivering a signal from an eNB to a UE via a downlink data channel of a physical layer, or a method of delivering a signal from a UE to an eNB via an uplink data channel of a physical layer. The higher signaling refers to delivering a signal between an eNB and a UE using at least one of RRC signaling, PDCP signaling, or MAC control element (MAC CE).

Hereinafter, embodiments of the disclosure will describe an uplink transmission resource allocation method which reduces a delay between transmission of uplink transmission configuration information and configured uplink transmission, when one or more services including eMBB, mMTC, URLLC, and the like are provided to a UE. Also, embodiments of the disclosure will provide a description by assuming an eNB and a UE that perform uplink transmission via a licensed band or unlicensed band. However, the embodiments of the disclosure may be applicable without distinguishing a licensed band or unlicensed band.

Generally, an eNB performs configuration (scheduling) of a predetermined transmission time interval (TTI) and a frequency resource area, so that a UE is capable of transmitting uplink data or control information corresponding to eMBB, mMTC, URLLC, and the like. For example, the eNB may perform configuration for a predetermined UE via a downlink control channel in subframe n, so that the UE is capable of performing uplink transmission in subframe n+k (k=0). In other words, the eNB may transfer uplink transmission configuration information to the UE that needs uplink transmission, via a downlink control channel in subframe n, and the UE that receives the uplink transmission configuration information may transmit uplink data or control information to the eNB (or another UE) using the time and frequency resource areas configured in the uplink transmission configuration information. In this instance, the UE which has data or control information to be transferred via an uplink may transmit scheduling request information to the eNB, or may request the eNB to transmit the uplink transmission configuration information to the UE via a random access process.

In other words, generally, uplink transmission of a UE may be performed via the three steps as follows. In this instance, uplink transmission performed via the three steps is merely an example. Uplink transmission may be performed via steps, the number of which is more or fewer than three.

Step 1: A UE which has data or control information to be transmitted via an uplink may request uplink transmission configuration for the UE from an eNB via an available uplink resource that is capable of transmitting an uplink transmission configuration request. In this instance, at least one of a time resource or a frequency resource that is capable of requesting uplink transmission configuration may be defined in advance or may be configured via a higher signal.

Step 2: The eNB that receives the uplink transmission configuration request from the UE, transmits uplink transmission configuration information to the UE via a downlink control channel, and configures uplink transmission.

Step 3: The UE, for which the uplink transmission is configured by the eNB, performs uplink transmission using the uplink transmission configuration information configured by the eNB.

That is, the UE that has data or control information to be transmitted via an uplink may have a transmission delay of at least a predetermined period of time when transmitting the uplink information. For example, if an uplink transmission configuration request resource is configured at intervals of 5 ms in the UE that has uplink transmission data to be transmitted at a time n, a delay of a maximum of 5 ms may exist for transmitting the uplink transmission configuration request information. Also, when a transmission delay (e.g., 1 ms) is needed between an uplink configuration control information reception time and an uplink transmission initiation time, a transmission delay of at least 6 ms may be inevitable when the UE initiates uplink transmission. In the normal LTE system, a transmission delay between an uplink configuration control information reception time and an uplink transmission initiation time is at least 4 ms. Therefore, the disclosure provides a method that enables a UE, which desires to perform uplink signal transmission, to perform uplink transmission without reception of uplink transmission configuration information separately from an eNB, and reduces an uplink transmission delay.

Generally, a UE may receive uplink transmission configuration information, uplink scheduling configuration information, or UL grant delivered via a downlink control channel (e.g., PDCCH) transmitted from an eNB, and may transmit uplink information (e.g., an uplink data channel (PUSCH)) according to the received uplink transmission configuration information. This scheme is referred to as a first uplink transmission scheme or grant-based uplink transmission scheme. A UE may transmit uplink information according to uplink transmission configuration information configured in advance, without receiving uplink transmission configuration information, uplink scheduling configuration information, or UL grant delivered via a downlink control channel (e.g., a PDCCH) transmitted from an eNB, or a UE may autonomously select at least one piece of configuration information from among uplink transmission configuration information configured in advance, and may transmit uplink information according to the uplink transmission configuration information configured in advance and the selected uplink transmission configuration information. This scheme is referred to as a second uplink transmission scheme, a grant-free uplink transmission scheme, or a non-scheduling-based uplink transmission scheme. In other words, the second uplink transmission refers to an operation in which a UE perform uplink transmission without receiving a DCI format that delivers uplink transmission configuration information via a PDCCH transmitted from an eNB. In the second uplink transmission scheme, the uplink transmission configuration information related to uplink transmission of initial transmission may initiate the uplink transmission, based on uplink transmission configuration information, uplink scheduling configuration information, or UL grant delivered via a downlink control channel (e.g., a PDCCH) transmitted from the eNB.

Generally, downlink and uplink transmission or reception of an eNB and a UE may be performed based on a predetermined transmission time interval (TTI). For example, in the LTE system, a basic transmission time interval may be configured based on 14 OFDMs or 1 ms in the case of a system that uses a normal CP. That is, an eNB transmits, to an UE, at least one signal or channel from among a downlink control signal, a control channel, and a data channel using a part or the entirety of the TTI of 1 ms. For example, an eNB may transmit a downlink control channel to a UE during a period corresponding to one or a plurality of OFDM symbols in the 1-ms TTI, and may transmit an uplink data channel to the UE in symbols in which the control channel is not transmitted in the 1 ms TTI. In other words, the UE transmits at least one signal or channel from among uplink control information, a control channel, and a data channel to the eNB using a part or the entirety of the 1-ms TTI. In this instance, the eNB and the UE may perform downlink and uplink signal transmission or reception using a plurality of TTIs. Generally, the eNB and the UE may perform communication based on the 1-ms TTI. In NR, a basis transmission time interval may be configured based on K OFDM symbols (in this instance, K=7 or 14) in the case of a normal CP. In this instance, the actual time length of the basic transmission interval may vary depending on the distance between sub-carriers used in a wireless communication system, but the fact that the K symbols is the basic transmission time interval may be applied equally.

An eNB and a UE which perform wireless communication in an unlicensed band, may measure a reception signal strength in the unlicensed band during a predetermined period of time or a period of time determined according to a rule, and may use the unlicensed band when the measured reception signal strength is less than or equal to a defined reference value (when the unlicensed band is in the idle state), and may not use the unlicensed band when the measured reception signal strength is greater than or equal to the defined reference value (when the unlicensed band is not in the idle state or when another wireless communication device uses the unlicensed band). The operation is referred to as a channel access procedure or a listen-before-talk (LBT) operation. After the channel access procedure, if the eNB or the UE determine that the unlicensed band is in the idle state, the eNB or the UE may continuously use the unlicensed band according to a rule defined for each area and/or frequency band. This is referred to as a maximum channel occupancy time (MCOT) or a channel occupancy interval. For example, in the case of an unlicensed band of 5 GHz in Japan, the maximum channel occupancy time that an eNB or a UE can continuously uses may be limited to 4 ms. In this instance, the period of time that allows the continuous use may indicate the maximum time that allows the use without an additional channel access procedure after the channel access procedure. In this instance, whether channel access is allowed in the unlicensed band is depending on whether adjacent devices use the unlicensed band. A period of time during which channel access in the unlicensed band is allowed, and which is determined via the channel access procedure, may be a time in the TTI. Therefore, when an eNB and a UE perform communication using only the basic transmission time interval (e.g., 1-ms TTI), the efficiency of using a channel may be decreased. Therefore, the disclosure proposes a method that enables an eNB and a UE, which perform communication based on a basic transmission time interval, to perform communication by additionally using a transmission time interval shorter than the basic transmission time interval, so that wireless communication may be effectively performed.

Figure 5:
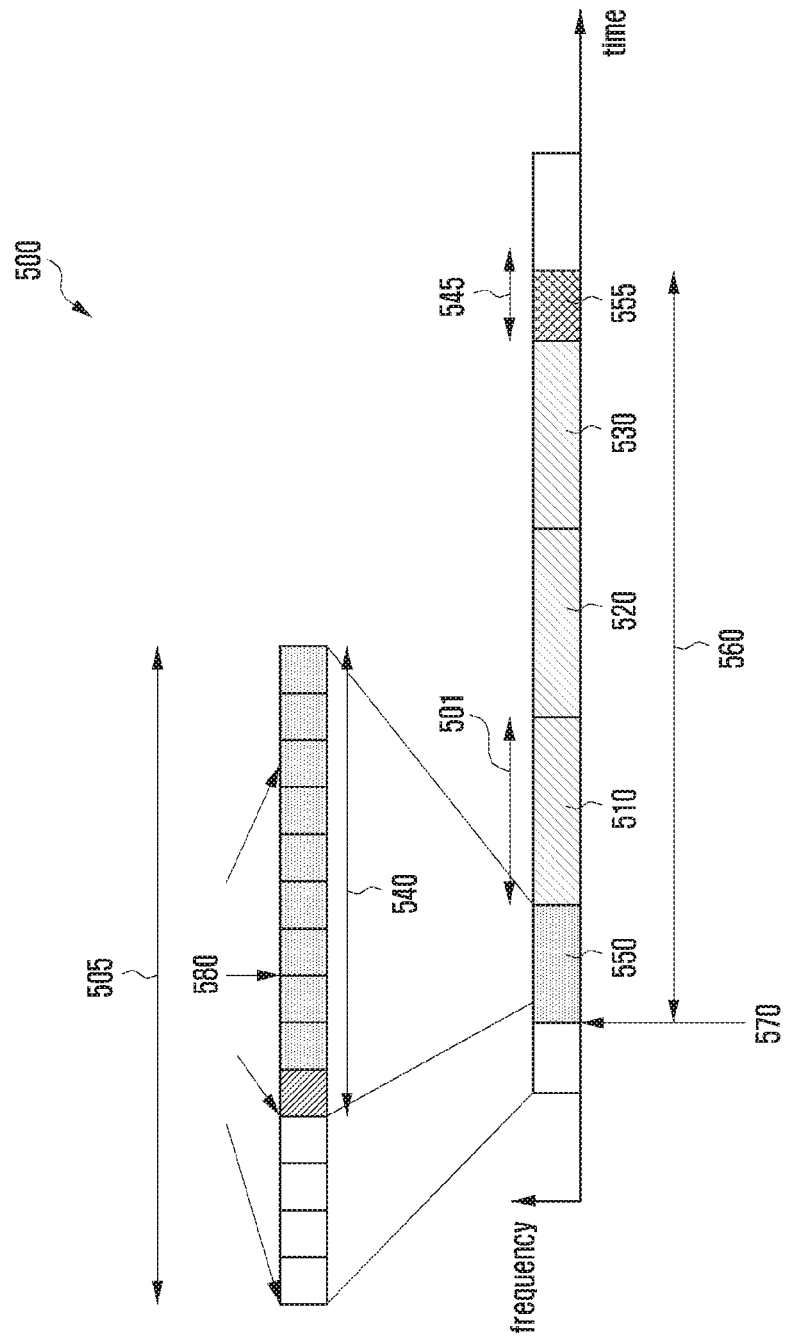
FIG. 5 is a diagram illustrating an embodiment of the disclosure.

This will be described in detail with reference to FIG. 5. An eNB and a UE may perform wireless communication using a basic transmission time interval 501 of FIG. 5. In other words, the eNB and the UE may perform wireless communication in units of subframes 510, 520, and 530. If the eNB and the UE perform wireless communication in an unlicensed band, the eNB or the UE may perform a channel access procedure in order to access or use the unlicensed band, and may perform communication via the unlicensed band depending on information associated with whether the unlicensed band is in the idle state, which is determined via the channel access procedure. In this instance, a period of time that allows the eNB or the UE to continuously use the unlicensed band after the channel access procedure, as shown in the diagram 560, may be defined in advance or may be configured by the eNB for the UE via a higher signal.

A description will be provided under the assumption that the eNB desires to use the unlicensed band, in the case in which the eNB and the UE perform wireless communication only in units of subframes in the system. The eNB that desires to communicate with the UE using the unlicensed band may perform a channel access procedure with respect to the unlicensed band. If the eNB determines that the unlicensed band is in the idle state at a point in time 570 while performing a channel access procedure with respect to the unlicensed band, the eNB may continuously use the unlicensed band during a maximum occupancy time 560 from the point in time 570 at which it is determined that the unlicensed band is in the idle state.

However, if the eNB and the UE perform communication in units of subframes or in units of 1 ms-TTIs, the eNB and the UE are incapable of performing communication at the point in time 570 within the subframe, and thus, the eNB is capable of communicating with the UE from the subframe 510. In this instance, in order to occupy the channel, the eNB may need to transmit a signal to occupy the channel (e.g., a channel occupancy signal or reservation signal) from a point in time at which the channel access procedure is terminated to a point in time at which a subsequent subframe starts. If the eNB does not transmit the channel occupancy signal, another communication device may determine that the unlicensed band is in the idle state and may use the unlicensed band. Also, if the eNB and the UE perform communication in units of subframes, an interval 540 in which occupancy of the channel begins and an interval 545 in which occupancy of the channel is terminated may not be used. Therefore, if communication is performed in units of subframes, the unlicensed band may not be effectively used. In this instance, if the eNB and the UE perform communication in units of subframes, uplink communication may not also effectively use the unlicensed band.

Therefore, in the disclosure, the eNB and the UE define one or more additional transmission time units which are shorter than a reference transmission time unit, and use the additional transmission time unit for a time at which occupancy of the channel starts and a time at which occupancy of the channel is terminated, and thus, the eNB and the UE may efficiently perform communication.

Hereinafter, according to an embodiment related to uplink signal transmission in the disclosure, the transmission time interval/length of uplink transmitted from the UE, a symbol length, or the number of symbols may be configured by the eNB in advance via a higher signal. Also, the uplink transmission configuration information may include only identification information that distinguishes whether the uplink transmission is based on a normal uplink transmission subframe (e.g., uplink data transmission using 14 symbols or 12 symbols or more), or is based on an uplink transmission subframe that performs transmission using the number of symbols configured by the higher signal. Also, a description will be provided under the assumption that an SRS signal is not transmitted in an additionally configured uplink transmission interval. However, even when the UE is configured to transmit an SRS signal in an uplink transmission interval, data and SRS are transmittable in the additional uplink transmission interval according to the disclosure. For example, when a UE, for which uplink data transmission using the last X symbols in a single subframe is configured, is required to perform SRS transmission in the subframe, the UE may transmit an SRS in Y symbols for which SRS transmission is configured among the uplink transmission symbols, and may transmit data using the remaining (X−Y) symbols. In this instance, the uplink data may be rate-matched using X−Y symbols and may be transmitted. Alternatively, data is generated using X symbols and transmitted by puncturing Y symbols. In this instance, when the UE, for which uplink data transmission using the last X symbols in the single subframe is configured, is also required to perform SRS transmission using Y symbols in the subframe, the UE may transmit an SRS in the last Y symbols among the uplink transmission symbols, and may transmit data using the configured X symbols. In this instance, the data may be transmitted from an $X+Y^{th}$ symbol from the last symbol of the subframe.

Also, whether to transmit an SRS in the subframe may be determined based on uplink scheduling information that the UE receives, or an SRS transmission request field included in downlink scheduling information that the UE receives. In addition, a group common control channel (or common PDCCH) includes a field indicating information on whether an SRS transmission symbol exists in the subframe, and whether to transmit an SRS in the subframe may be determined using the field. Also, the location of one or more symbols in which an SRS is transmittable in the subframe may not always need to be the last symbol of the subframe. The UE may receive the location of one or more symbols in which an SRS is transmittable, from the eNB via a higher signal, or may determine the location, based on an SRS transmission request field transmitted from the eNB.

First Embodiment

The first embodiment describes a method in which an eNB defines an additional transmission time unit for downlink transmission which is usable for a time at which occupancy of a channel begins, and a method in which a UE determines the same. Also, in the embodiment, a description will be provided by assuming an eNB and a UE capable of performing uplink transmission using at least one additional transmission time unit from among an additional transmission time unit for uplink transmission which is usable for a time at which occupancy of a channel begins or for a subframe in which downlink/uplink transmission begins, and an additional transmission time unit for uplink transmission which is usable for a time at which a UE terminates occupancy of a channel or for the last subframe of downlink/uplink transmission.

The eNB may configure, for a UE, a time for receiving a downlink control channel which is defined in advance or is transmitted from the eNB to the UE via a higher signal. For example, the eNB may perform configuration for the UE such that the UE receives a downlink control channel transmitted from the eNB in all OFDM symbols within a basic transmission time unit (hereinafter, a subframe). As another example, the eNB may perform configuration for the UE such that the UE receives a downlink control channel transmitted from the eNB in a predetermined OFDM symbol within a subframe. In this instance, the predetermined OFDM symbol may be configured via a higher signal or it is defined to receive a downlink control channel transmitted from the eNB in a predetermined location, for example, the location of a symbol in which CRS port 0 or 1 is transmitted (symbol indices 0, 4, 7, and 11) as shown in the diagram 580, or every second symbol. As another example, it is defined to receive a downlink control channel transmitted from the eNB in a predetermined location of a symbol (e.g., symbol indices 0, 3, 5, 7, 9, and 11).

As described above, in a symbol 580 configured for the reception of a downlink control channel, configured by the eNB or defined in advance, the UE may receive a downlink control channel transmitted from the eNB. If the UE receives a downlink control channel transmitted from the eNB to the UE and the downlink control information received via the received downlink control channel is configured to enable the UE to perform reception of downlink data information from the eNB, the UE may determine that the length of a downlink start transmission interval is from the symbol in which the downlink control channel is received to a symbol 540 immediately before a subsequent basic transmission interval 550, without transmission of additional information related to the downlink transmission interval or a transmission length. In this instance, the UE may determine the symbols from the symbol immediately after the symbol in which the downlink control channel is transmitted, or from the indices or a number of symbols for beginning transmission of the downlink data channel determined via a separate downlink control channel (e.g., PCFICH), to the symbol immediately before the subsequent basic transmission interval 550, as a transmission time interval of the downlink data channel, and may receive downlink data from the eNB during the determined downlink data channel transmission time interval.

In this instance, the UE may determine the length of the downlink transmission interval, based on a DCI format that delivers downlink control information or downlink scheduling information transmitted from the eNB via the downlink control channel. In other words, the eNB directly informs a UE of the length of the downlink additional transmission interval via a DCI format that delivers downlink control information or downlink scheduling information of the UE, from among the length of a single downlink additional transmission interval or the length of one or more downlink additional transmission intervals defined in advance or scheduled for the UE via a higher signal. The UE that receives the downlink additional transmission interval length information may receive a downlink control signal and a data channel from the eNB, based on the received additional transmission interval length.

Unlike a UE that receives a downlink control channel periodically in units of subframes or slots, and determines whether downlink and uplink scheduling information is received from the control channel, in the case of a UE that receives a downlink control channel, based on a unit shorter than a subframe or a slot, and determines whether downlink and uplink scheduling information is received from the control channel, whether downlink and uplink scheduling information is received from the control channel is frequently determined and thus, the amount of power consumed by the UE may increase. Therefore, the operation of determining whether a downlink control channel is received and whether scheduling information is received, performed by the UE that receives a downlink control channel, based on a unit shorter than a subframe or a slot and determines whether downlink and uplink scheduling information is received from the control channel may be different from the operation performed by the UE that receives a downlink control channel periodically in units of subframes or slots, and determines whether downlink and uplink scheduling information is received from the control channel. In this instance, for the UE that receives a downlink control channel, based on a unit shorter than a subframe or a slot, and determines whether downlink and uplink scheduling information is received from the control channel, the location of a symbol or a period for receiving a downlink control channel from an eNB in units of subframe or slots, or the location of a symbol or a period for receiving a downlink control channel, based on a unit shorter than a subframe or slot may be configured, respectively. In this instance the periods may be identical to, or different from, each other.

Also, for the UE that receives a downlink control channel, based on a unit shorter than a subframe or a slot, and determines whether downlink and uplink scheduling information is received from the control channel, the number of times that blind decoding is performed for a downlink control channel in order to determine whether uplink/downlink scheduling information is received, at a time scheduled for receiving a downlink control channel from the eNB in units of subframes or slots, may be configured to be different from the number of times that blind decoding is performed for a downlink control channel in order to determine whether uplink/downlink scheduling information is received, at a time scheduled for receiving a downlink control channel, based on a unit shorter than a subframe or a slot. In this instance, the number of times that blind decoding is performed may be configured to be the same as each other.

The number of times that blind decoding is performed according to a time scheduled for monitoring or receiving a downlink control channel by a UE may be reduced by using a scheme of performing configuration so as not to receive one or more downlink control information (or DCI format), a scheme of configuring one or more downlink control information to increase/decrease the number of times that blind decoding is performed, a scheme of performing configuration so as not to use an aggregation level used for transmitting one or more downlink control information, or a combination of the schemes. Also, the number of times that blind decoding is performed according to a time scheduled for monitoring or receiving a downlink control channel may be increased.

For example, the UE may be scheduled to not receive uplink scheduling information at a time scheduled for receiving a downlink control channel, based on a unit shorter than a subframe or a slot (e.g., another downlink control channel reception time excluding a slot or a subframe). As another example, at a time scheduled for receiving a downlink control channel, based on a unit shorter than a subframe or slot, the UE may be scheduled to not receive downlink control information transmitted in a common search space for receiving a downlink control channel.

Second Embodiment

The second embodiment describes a method in which a UE defines an additional transmission time interval/length for uplink transmission which is usable for a time at which the UE begins occupancy of a channel, and an additional transmission time interval/length for uplink transmission which is usable for a time at which the UE ends occupancy of a channel, and a method in which a UE determines uplink transmission configuration information received from an eNB. In the embodiment, a description will be provided by assuming an eNB and a UE capable of performing uplink transmission using at least one additional transmission time unit from among an additional transmission time unit for uplink transmission which is usable for a time at which occupancy of a channel begins or for a subframe in which downlink/uplink transmission begins, and an additional transmission time unit for uplink transmission which is usable for a time at which the UE ends occupancy of a channel or for the last subframe of downlink/uplink transmission.

Generally, uplink transmission by a UE may be scheduled by an eNB via a DCI format that delivers uplink scheduling information, uplink transmission configuration information, or uplink transmission configuration information transmitted via a downlink control channel of the eNB. For example, in a downlink subframe 625 of FIG. 6, a UE may receive uplink transmission configuration information transmitted via a downlink control channel transmitted from the eNB, and may transmit at least one signal and/or channel from among an uplink control signal, a control channel, or a data channel to the eNB in a subframe (e.g., a subframe 655) scheduled for uplink transmission according to the received uplink transmission configuration information.

Therefore, for the UE that is configured to perform uplink transmission using at least one additional transmission time interval/length from among an additional transmission time interval/length for uplink transmission which is usable for a time at which occupancy of a channel begins, and an additional transmission time interval/length for uplink transmission which is usable for a time at which the UE ends occupancy of a channel, the transmission time interval/length for scheduled uplink transmission may be scheduled via uplink transmission configuration information transmitted from the eNB via a downlink control channel. For example, in addition to an uplink transmission scheme that performs uplink data channel transmission using 14 symbols or a subframe, in the case of a UE that is scheduled, by the eNB via a higher signal, to perform uplink data channel transmission using one or more symbols (e.g., transmitting an uplink signal using 2 symbols, 4 symbols, 7 symbols, or the like), information associated with a transmission time interval/length, a symbol length, or the number of symbols of uplink transmission by the UE may be included in the uplink transmission configuration information transmitted via a downlink control channel of the eNB in order to support the uplink transmission of the UE.

In this instance, the information associated with a transmission time interval/length, a symbol length, or the number of symbols of uplink transmission, which is configured for uplink transmission of the UE and is included in the uplink transmission configuration information, may be included in the uplink configuration information according to the following method.

Method 1: determination based on a field indicating uplink transmission time interval/length information and a field indicating start location information of the uplink transmission time interval/length.

Figure 6:
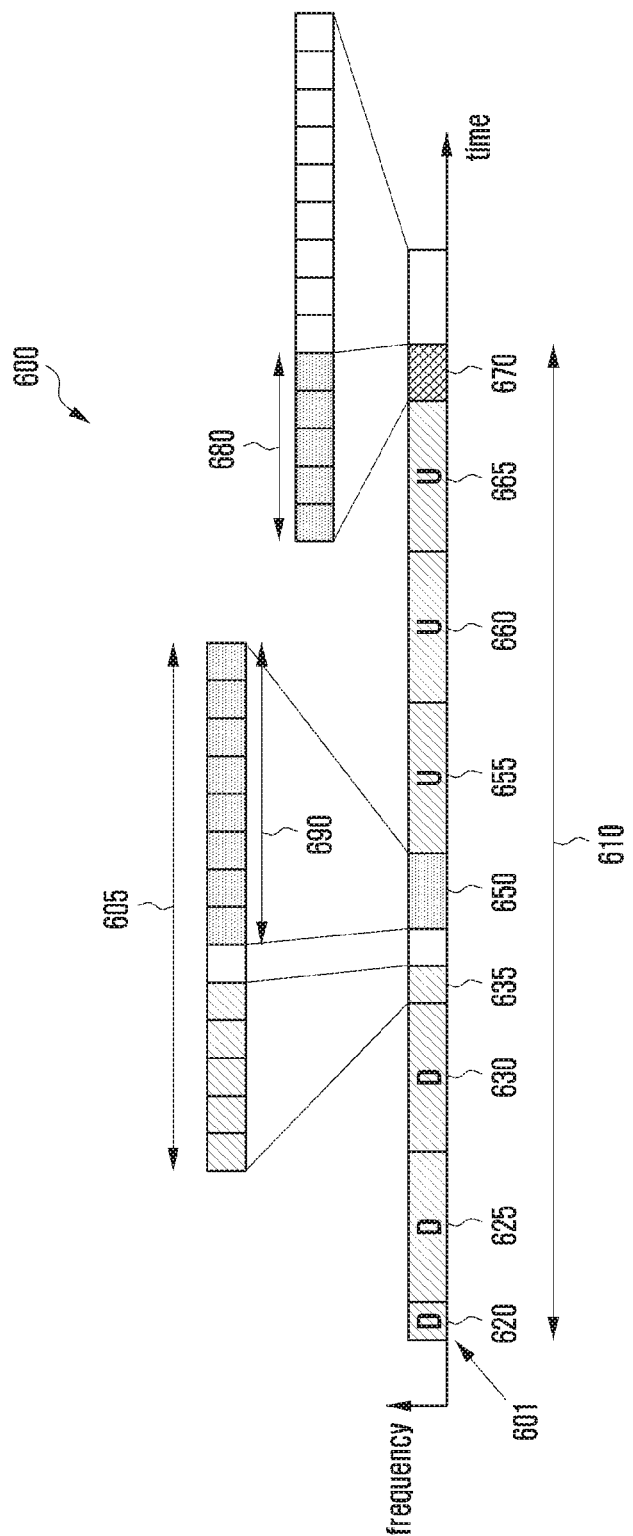
FIG. 6 is a diagram illustrating another embodiment of the disclosure.

The method 1 will be described in detail with reference to FIG. 6. In the case of a UE that is configured to perform uplink signal transmission via one or more uplink transmission time intervals/lengths 605, 680, and 690 as illustrated in FIG. 6, a field for indicating the configured uplink transmission time interval/length may be added to uplink transmission configuration information (hereinafter, UL grant) transmitted from an eNB via a downlink control channel. In this instance, the field indicating the uplink transmission time interval/length may include a value indicating an uplink transmission time interval/length using 14 symbols or 12 symbols or more, that is, the length of a subframe or a basic transmission unit. This may be applied to the present embodiment, and may also be applied to the embodiments of the disclosure.

Also, a field for configuring a point in time at which the configured uplink transmission time interval/length is applied in a subframe may be added to the uplink transmission configuration information (hereinafter, UL grant) transmitted via the downlink control channel (e.g., the uplink transmission time interval/length configured via the UL grant starts from a first symbol 680 of a subframe or the configured uplink transmission time interval/length starts from a symbol index corresponding to a symbol obtained in consideration of the configured uplink transmission time interval/length in a subframe (e.g., 14—the number of symbols included in the uplink transmission time interval/length). In other words, the field indicating the uplink transmission time interval/length and the field indicating, or guiding determination of, the index of a symbol where the indicated uplink transmission time interval/length starts in the subframe, may be included in the UL grant.

If the UE is scheduled, via a single UL grant transmitted via a downlink control channel of an eNB, so as to perform uplink transmission in one or more subframes, in other words, if one UL grant includes transmission configuration information with respect to a plurality of uplink subframes (e.g., UL grant transmitted in the subframe 625 schedules uplink in 5 subframes 650, 655, 660, 665, and 670), method 1 may not schedule uplink transmission of at least one of the scheduled uplink subframes 650 to 670. Therefore, method 1 is more suitable for the case in which a UE is scheduled, via a single UL grant transmitted via a downlink control channel of an eNB, so as to perform uplink transmission in a single subframe.

In the case in which a UE is scheduled via a single UL grant transmitted via a downlink control channel of an eNB, so as to perform uplink transmission in one or more subframes, uplink transmission in a plurality of subframes having different transmission time intervals/lengths may be scheduled by including one or more uplink transmission time intervals/lengths in the UL grant, which will be described in method 2.

Method 2: determination based on a field indicating an indicator of an additional transmission time interval/length for uplink transmission which is usable for a time at which a UE begins occupancy of a channel, and an indicator of an additional transmission time interval/length for uplink transmission which is usable for a time at which a UE ends occupancy of a channel.

The method 2 will be described in detail with reference to FIG. 6. According to Method 2, a field indicating an uplink transmission time interval/length includes values for indicating two uplink transmission time intervals/lengths. For example, the case in which a UL grant transmitted in the subframe 625 schedules uplink in 5 subframes 650, 655, 660, 665, and 670 will be described. In this instance, the most significant bit (MSB) of the field may be a value indicating an uplink transmission time interval/length 690 in a first subframe of a plurality of uplink subframes configured by the UL grant, and the least significant bit (LSB) of the field may be a value indicating an uplink transmission time interval/length 680 in a last subframe of the plurality of uplink subframes configured by the UL grant. In this instance, the most significant bit (MSB) of the field may be a value indicating the uplink transmission time interval/length 680 in a last subframe of the plurality of uplink subframes configured by the UL grant, and the least significant bit (LSB) of the field may be a value indicating the uplink transmission time interval/length 690 in a first subframe of the plurality of uplink subframes configured by the UL grant. In this instance, according to method 2, a field indicating an uplink transmission time interval/length in a first subframe among the plurality of uplink subframes configured by the UL grant and a field indicating an uplink transmission time interval/length in the last subframe of the plurality of uplink subframes configured by the UL grant may be separately included in the UL grant.

In this instance, the UE may determine that the uplink transmission time interval/length for the subframes remaining after excluding the first and last subframes determined based on the field indicating the uplink transmission time interval/length in uplink transmission via the plurality of subframes configured by the eNB is the same as a defined basic transmission time interval/length (e.g., 1 ms or 14 symbols in the case of a normal CP) or a basic transmission time interval/length determined based on a subcarrier interval or the like.

In this instance, the UE may perform uplink transmission, scheduled by the eNB, based on the uplink transmission time interval/length determined according to method 1 or method 2.

Third Embodiment

The third embodiment describes a method in which a UE defines an additional transmission time interval/length for uplink transmission which is usable for a time at which the UE begins occupancy of a channel, and an additional transmission time interval/length for uplink transmission which is usable for a time at which the UE ends occupancy of a channel, and the UE determines whether an additional transmission time interval/length for uplink transmission which is determined based on uplink transmission configuration information received from an eNB is included in a channel occupancy interval of the eNB. In the embodiment, a description will be provided by assuming an eNB and a UE capable of performing uplink transmission using at least one additional transmission time unit from among an additional transmission time unit for uplink transmission which is usable for a time at which occupancy of a channel begins or a subframe in which downlink/uplink transmission begins, or an additional transmission time unit for uplink transmission which is usable for a time at which the UE ends occupancy of a channel or the last subframe of downlink/uplink transmission.

In the case of the eNB and the UE that perform communication in an unlicensed band, information associated with a time at which the eNB or the UE begins access to or begins occupying the frequency band to use the unlicensed band is not known. Accordingly, the UE may need to continuously receive a downlink control channel at a point in time at which the downlink control channel may be transmitted from the eNB, and may need to identify whether downlink or uplink scheduling information is received. Generally, in the case of uplink signal transmission, a UE receives scheduling information (hereinafter, UL grant) associated with uplink transmission from an eNB, and the UE that receives the UL grant may perform uplink transmission according to uplink transmission configuration information indicated by the eNB via the UL grant. Therefore, in a subframe in which the UE performs uplink transmission in the unlicensed band, a downlink control channel is not transmitted. Therefore, if the UE is aware of an uplink transmission interval of the unlicensed band, the UE may not perform an unnecessary downlink control channel reception operation in the uplink transmission interval. In this instance, the uplink transmission interval described in the embodiment is a time that is scheduled by an eNB for a UE to perform uplink transmission or a time during which the UE is allowed to perform uplink transmission. The uplink transmission interval may be expressed as an uplink occupancy interval.

Also, the uplink transmission interval corresponds to the maximum channel occupancy time during which the eNB occupies the unlicensed band via a channel access procedure, and thus, uplink transmission transmitted within the maximum channel occupancy time may be performed without a channel access procedure. Alternatively, the channel access procedure is performed during a fixed period of time (e.g., 25 us) so as to determine whether a channel of the unlicensed band is in the idle state, and may perform configured uplink transmission when the unlicensed band is in the idle state. Therefore, the uplink transmission interval information may be useful information to the UE.

In other words, uplink transmission is scheduled by an eNB for a UE via UL grant transmission, and thus, the eNB may be aware of an uplink transmission interval. Also, a subframe in which the uplink transmission is performed may be an uplink subframe for all UEs that communicate with the eNB, in other words, for both a UE which is scheduled via UL grant transmission from the eNB and a UE which is not scheduled via the UL grant transmission from the eNB. Therefore, the eNB may inform all UEs that communicate with the eNB or a predetermined group of UEs, of the uplink transmission interval via a common control channel (common PDCCH).

Figure 7:
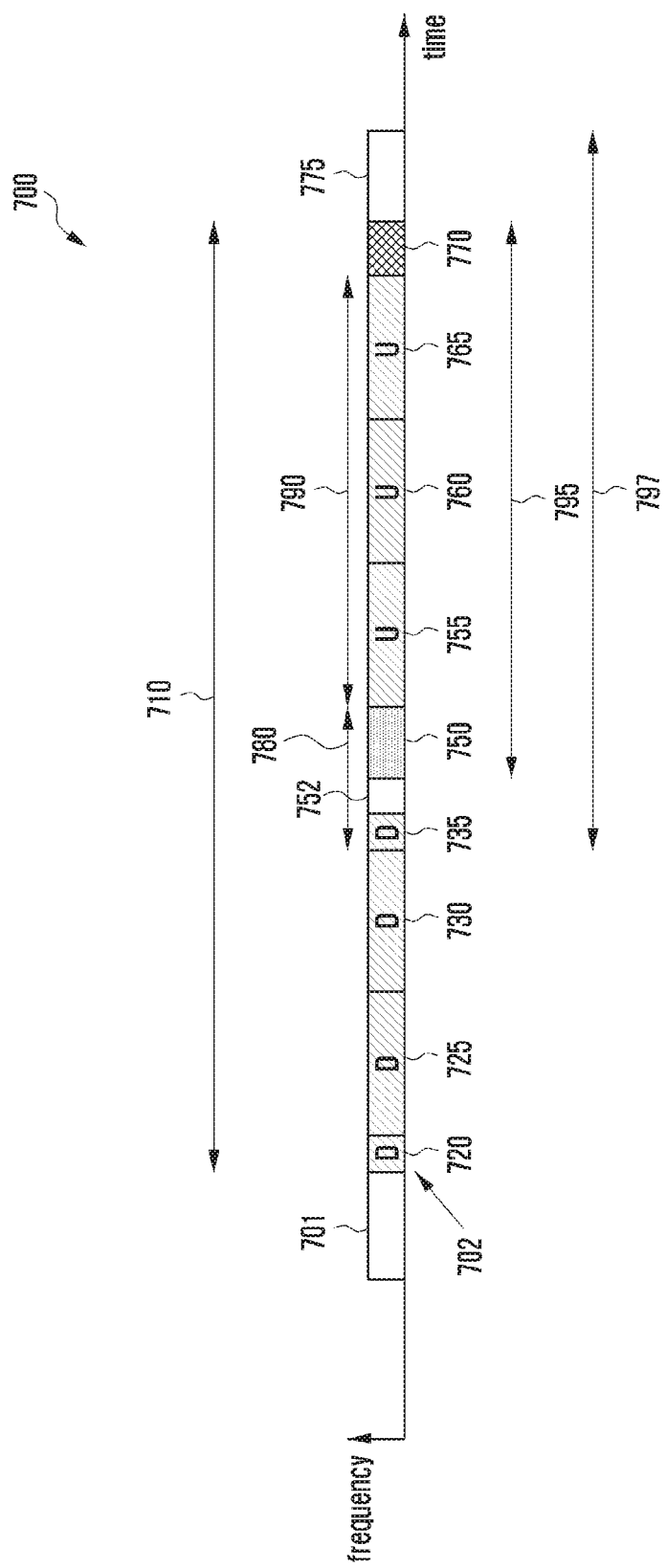
FIG. 7 is a diagram illustrating another embodiment of the disclosure.

A description will be provided in detail with reference to FIG. 7. An eNB that performs a channel access procedure may occupy the unlicensed band during a channel occupancy time 710 from a time 702 in a subframe 701, and may perform downlink and uplink communication during the channel occupancy time 710. In one or more downlink subframes (e.g., subframes 725, 730, and the like), the eNB may configure uplink transmission in subframes 752, 755, 760, 765, and 770 for one or more UEs. In this instance, the UE may be scheduled via a single UL grant, so as to perform uplink transmission in one or more subframes. Also, the eNB may inform all UEs that communicate with the eNB or a predetermined group of UEs, of the uplink transmission interval 790 or 795 via a common control channel (common PDCCH or C-PDCCH). In this instance, the common control channel may be transmitted in a last subframe 752 in which at least downlink transmission is performed. A method for the eNB to inform the uplink transmission interval is as follows. The eNB may inform one or more UEs of an uplink transmission interval via a C-PDCCH in the last subframe 725 in which at least downlink transmission is performed. In this instance, the eNB may inform the UE that the interval corresponding to the subframes 755, 760, and 765 is the uplink transmission interval 790 without taking into consideration uplink transmission using an additional uplink transmission time interval/length 750 and 770 proposed in the disclosure. The C-PDCCH may indicate information associated with the length or offset 780 from a subframe in which the C-PDCCH is transmitted to a point at which the uplink transmission interval starts, and information associated with the uplink transmission interval length 790, via a single field of the C-PDCCH in units of subframes. In this instance, the offset and the uplink transmission interval length may be indicated by separate fields in the C-PDCCH.

Provided is a description associated with a UE scheduled to perform uplink transmission in subframe n 752 using at least one additional transmission time unit from among an additional transmission time unit for uplink transmission which is usable for a time at which occupancy of a channel begins or a subframe in which downlink/uplink transmission begins, and an additional transmission time unit for uplink transmission which is usable for a time at which the UE ends occupancy of a channel or the last subframe of downlink/uplink transmission. Also, the case in which a subframe in which the C-PDCCH is transmitted last using the additional transmission time unit is subframe n 752, the case in which a subframe scheduled to perform uplink transmission using the additional transmission time unit and a subframe in which the C-PDCCH is transmitted are the same subframe, or the case in which the length or the offset 780 from subframe n to a point at which the uplink transmission interval starts, indicated by the transmitted C-PDCCH, is one subframe, will be considered. When the UE is scheduled by the UL grant received from the eNB, so as to perform uplink transmission in subframe n 752 using an additional transmission time unit, the UE may determine that the uplink transmission performed in subframe n 752 using the additional transmission time unit is included in the uplink transmission interval configured by the eNB, may perform a channel access procedure during a predetermined interval (e.g., 25 us), and may transmit the uplink signal when it is determined that the unlicensed band is in the idle state.

Similarly, provided is a description associated with a UE scheduled to perform uplink transmission in subframe n+4 755 using at least one additional transmission time unit from among an additional transmission time unit for uplink transmission which is usable for a time at which occupancy of a channel begins or for a subframe in which downlink/uplink transmission begins, and an additional transmission time unit for uplink transmission which is usable for a time at which the UE ends occupancy of a channel or the last subframe of downlink/uplink transmission. The case in which a point at which the uplink transmission interval, indicated by the C-PDCCH transmitted in subframe n, ends is a subframe 765 immediately before subframe 755 scheduled to perform uplink transmission using the additional transmission time unit, and uplink transmission scheduled to perform uplink transmission using the additional transmission time unit begins from uplink symbol 0 770, or the case in which a point at which the uplink transmission interval, indicated by the C-PDCCH transmitted in subframe n, ends has no gap with a subframe 755 configured to perform uplink transmission using the additional transmission time unit, that is, the uplink transmission configured to perform uplink transmission using the additional transmission time unit, will be considered. In this instance, the UE may determine that the uplink transmission performed in subframe n+4 755 using the additional transmission time unit is included in the uplink transmission interval configured by the eNB, may perform a channel access procedure during a predetermined interval (e.g., 25 us), and may transmit the uplink signal when it is determined that the unlicensed band is in the idle state.

As another example, the eNB enables the value of the length or the offset 780 from the subframe in which the C-PDCCH is transmitted to a point at which the uplink transmission interval starts to indicate 0, so that whether the uplink transmission configured to perform uplink transmission using the additional transmission time unit is included in the uplink transmission interval configured by the eNB may be determined.

As another example, the eNB may add a field indicating information associated with the length or offset 780 from the subframe in which the C-PDCCH is transmitted to a point at which the uplink transmission interval starts and information associated with the length of the uplink transmission interval 790 based on an additional transmission time unit, in addition to a field indicating information associated with the length or offset 780 from the subframe in which the C-PDCCH is transmitted to a point at which the uplink transmission interval starts and information associated with the length of the uplink transmission interval 790 in units of subframes. Accordingly, whether the uplink transmission configured to perform uplink transmission using the additional transmission time unit is included in the uplink transmission interval configured by the eNB may be determined.

As another example, the eNB may add a field indicating an additional transmission time length (or the number of symbols) in a subframe immediately before a subframe that starts the uplink transmission interval and/or an additional transmission time length (or the number of symbols) in a subframe immediately after a last subframe of the uplink transmission interval, in addition to a field indicating information associated with the length or offset 780 from the subframe in which the C-PDCCH is transmitted to a point at which the uplink transmission interval starts and information associated with the uplink transmission interval 790 in units of subframes. Accordingly, whether the uplink transmission configured to perform uplink transmission using the additional transmission time unit is included in the uplink transmission interval configured by the eNB may be determined.

Figure 8:
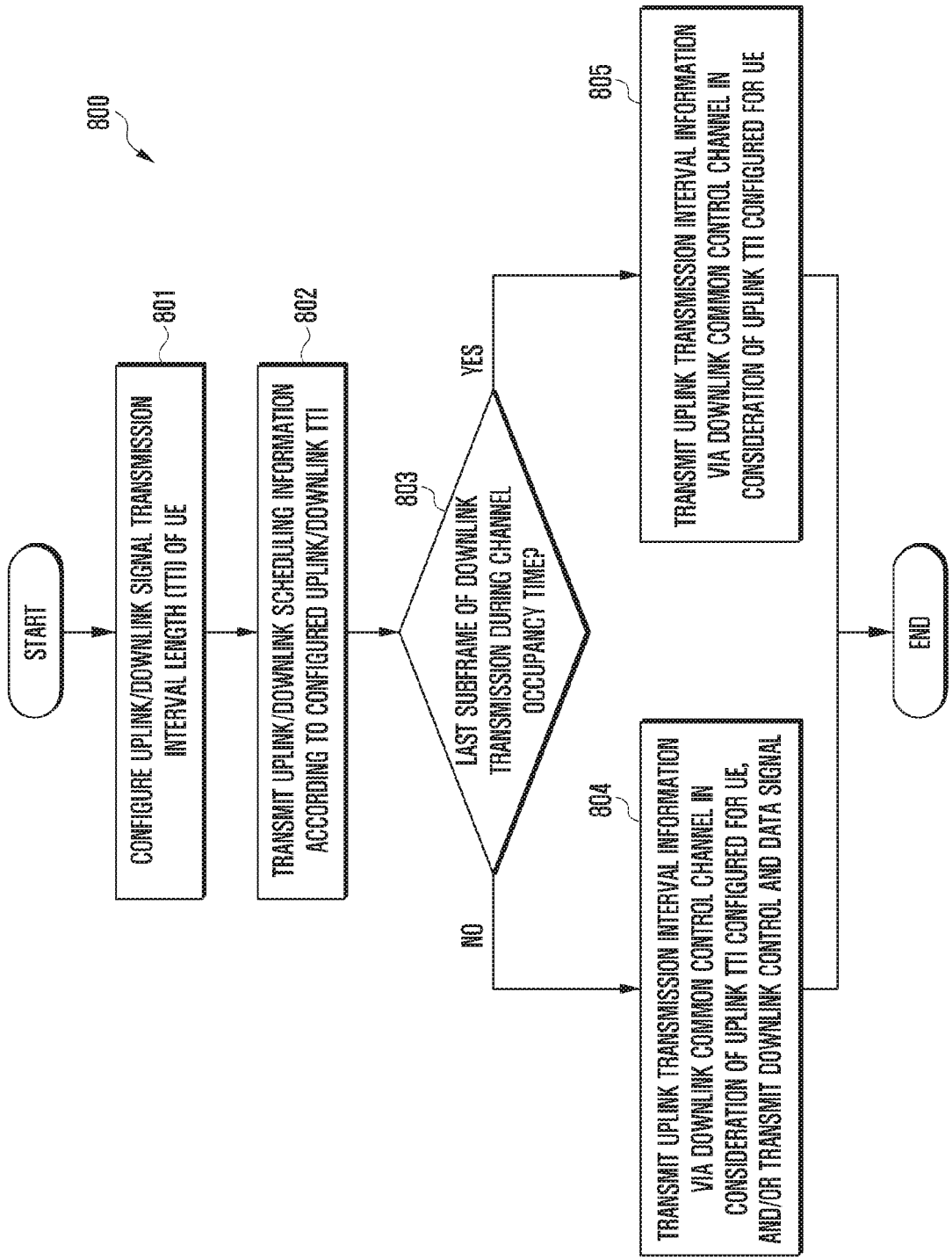
FIG. 8 is a diagram illustrating operation of an evolved NodeB (eNB) according to embodiments of the disclosure.

FIG. 8 illustrates a method of transmitting an uplink/downlink signal, transmitted or received according to uplink/downlink signal transmission interval length of an eNB according to the disclosure. In operation 801, an eNB configures, for a UE, one or more uplink/downlink signal transmission interval lengths which may be used for uplink/downlink transmission or reception of the eNB or a cell, using at least one method from among a higher signal, a broadcasting channel, or a downlink control channel. In operation 802, the eNB may schedule uplink/downlink signal transmission/reception for a UE by transmitting uplink/downlink scheduling information including uplink/downlink signal transmission interval length information proposed in the disclosure according to at least one signal transmission interval length among uplink/downlink signal transmission interval lengths configured in operation 801, to the UE via a downlink control channel.

If the eNB and the UE perform communication in an unlicensed band, the eNB performs transmission including at least a piece of uplink transmission interval information from among the maximum occupancy time interval during which the eNB or the UE may occupy or access the unlicensed band for use, a downlink transmission interval (or downlink occupancy interval) that may be used by the eNB for downlink signal transmission, or an uplink transmission interval (or uplink occupancy interval) that the UE may use for uplink signal transmission, to UEs via a downlink common control channel, in addition to the uplink/downlink scheduling information in operation 803. In this instance, the downlink common control channel may be transmitted at least in a last subframe that transmits a downlink signal within the channel occupancy time interval of the eNB. In this instance, a field indicating the length (or the number of symbols) of an additional transmission time in a subframe immediately before a subframe that starts the uplink transmission interval and/or the length (or the number of symbols) of an additional transmission time in a subframe immediately after a last subframe of the uplink transmission interval may be added to the downlink common control channel, in addition to a field indicating information associated with the length or offset from the subframe in which the downlink common control channel is transmitted to a point at which the uplink transmission interval starts and information associated with the uplink transmission interval in units of subframes. Accordingly, whether the uplink transmission configured to perform uplink transmission using the additional transmission time unit is included in the uplink transmission interval configured by the eNB may be determined. In this instance, without the field indicating the length (or the number of symbols) of the additional transmission time in a subframe immediately before a subframe that starts the uplink transmission interval and/or the length (or the number of symbols) of the additional transmission time in a subframe immediately after a last subframe of the uplink transmission interval, whether the uplink transmission which is scheduled by an eNB for a UE so as to perform uplink transmission using an additional transmission time unit, is included in the uplink transmission interval configured by the eNB may be determined according to the method proposed in the disclosure.

Figure 9:
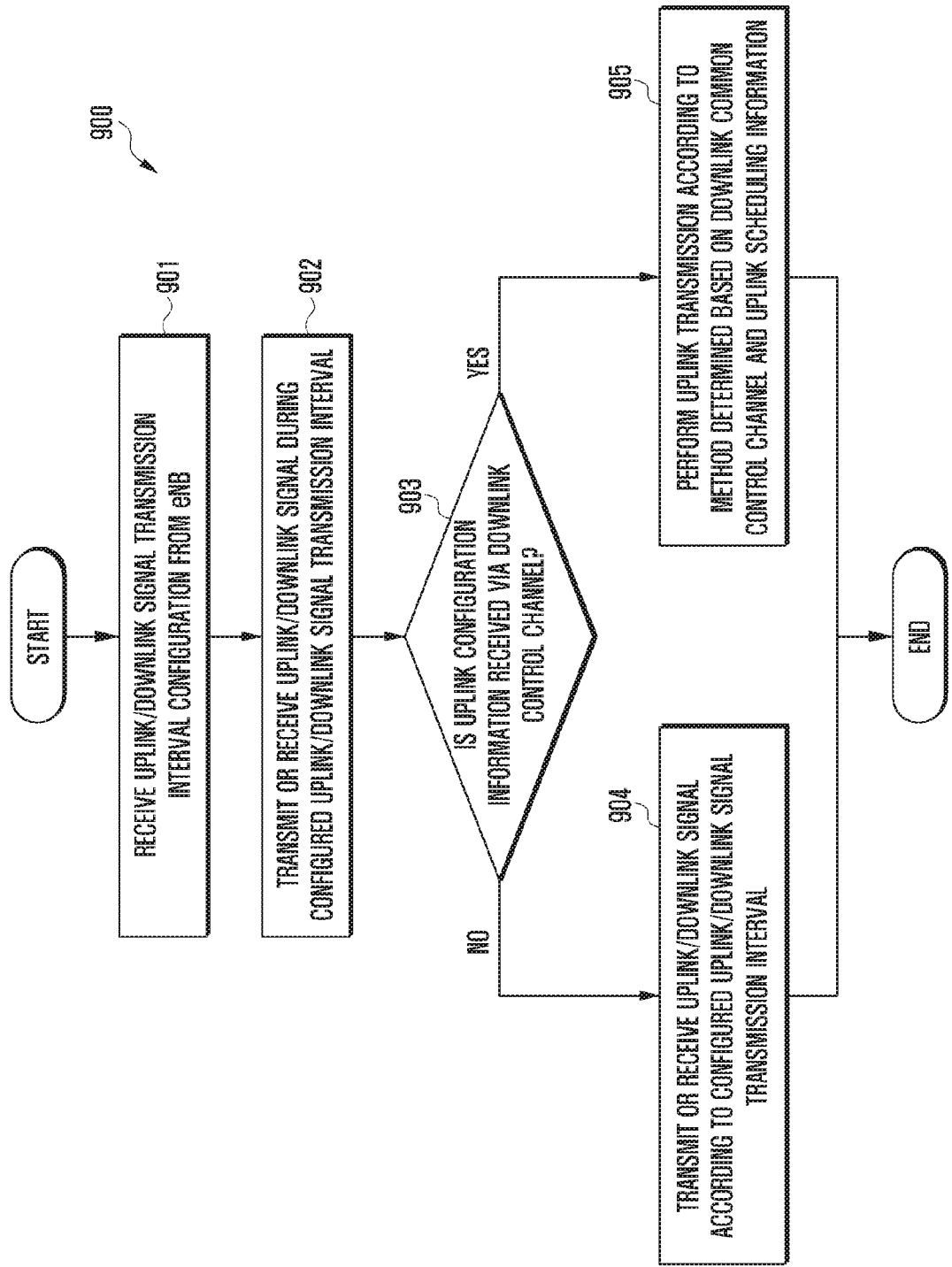
FIG. 9 is a diagram illustrating operation of a user equipment (UE) according to embodiments of the disclosure.

FIG. 9 illustrates a method of transmitting an uplink/downlink signal, transmitted or received according to an uplink/downlink signal transmission interval length of a UE according to the disclosure. In operation 901, the UE configures one or more uplink/downlink signal transmission interval lengths which may be used for uplink/downlink transmission or reception of an eNB or a cell, using at least one method from among a higher signal, a broadcasting channel, or a downlink control channel from the eNB. In operation 902, the UE may receive, via a downlink control channel transmitted from the eNB, uplink/downlink scheduling information including uplink/downlink signal transmission interval length information proposed in the disclosure according to at least one signal transmission interval length among uplink/downlink signal transmission interval lengths configured in operation 901. If the UE that receives the uplink scheduling information from the eNB in operation 902 communicates with the eNB in an unlicensed band, the UE receives at least a piece of uplink transmission interval information from among the maximum occupancy time interval during which the eNB or the UE may occupy or access the unlicensed band for use, a downlink transmission interval (or downlink occupancy interval) that the eNB may use for downlink signal transmission, or an uplink transmission interval (or uplink occupancy interval) that the UE may use for uplink signal transmission, from the eNB via a downlink common control channel, in addition to the uplink/downlink scheduling information from the eNB.

In this instance, the downlink common control channel may be transmitted at least in a last subframe that transmits a downlink signal within the channel occupancy time interval of the eNB. In this instance, the eNB may add, to the downlink common control channel, a field indicating the length (or the number of symbols) of an additional transmission time in a subframe immediately before a subframe that starts the uplink transmission interval and/or indicating the length (or the number of symbols) of an additional transmission time in a subframe immediately after a last subframe of the uplink transmission interval, in addition to a field indicating information associated with the length or offset value from a subframe in which the downlink common control channel is transmitted to a point at which the uplink transmission interval starts and information associated with the uplink transmission interval in units of subframes. Accordingly, whether the uplink transmission configured to perform uplink transmission using the additional transmission time unit is included in the uplink transmission interval configured by the eNB may be determined. In this instance, without the field indicating the length (or the number of symbols) of the additional transmission time in a subframe immediately before a subframe that starts the uplink transmission interval and/or the length (or the number of symbols) of the additional transmission time in a subframe immediately after a last subframe of the uplink transmission interval, the UE may determine whether the uplink transmission which is scheduled by the eNB, so as to perform uplink transmission using an additional transmission time unit, is included in the uplink transmission interval configured by the eNB, and may perform uplink signal transmission according to the determined uplink transmission configuration according to the method proposed in the disclosure in operation 905.

In order to implement the above-described embodiments, each of a UE and an eNB may include a transmitter, a receiver, and a processor. According to an embodiment, there are provided a method in which an eNB and a UE determine the length of an uplink/downlink signal transmission interval, and a transmission or reception method of the eNB and the UE in order to perform uplink signal transmission configured based on the determined length of the uplink/downlink signal transmission interval and channel occupancy time information. The transmitter, receiver, and the processor may perform the above-described operation. The transmitter and the receiver may be expressed as a transceiver which performs the functions of both the transmitter and the receiver, and the processor may be expressed as a controller.

Figure 10:
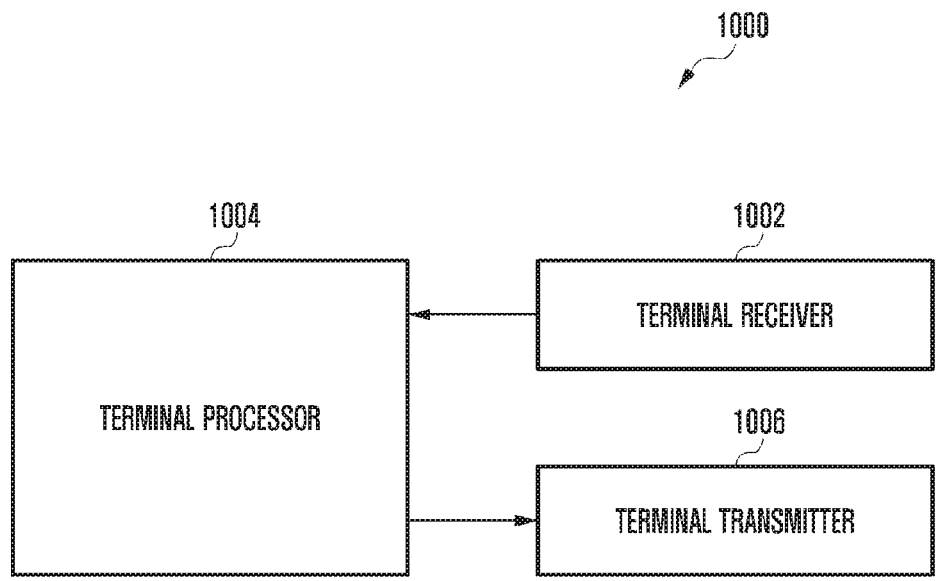
FIG. 10 is a block diagram illustrating the structure of a UE according embodiments.

FIG. 10 is a block diagram illustrating the structure of a terminal according embodiments.

Referring to FIG. 10, a terminal of the disclosure may include a terminal receiver 1002, a terminal transmitter 1006, and a terminal processor 1004. The terminal receiver 1002 and the terminal transmitter 1006 may be commonly known as a transceiver. The transceiver may transmit or receive a signal to/from a base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may measure the intensity of a signal received via a wireless channel and may output the same to the terminal processor 1004. The terminal processor 1004 may compare the intensity of the received signal with a predetermined threshold value and perform a channel access procedure, and may transmit a signal output from the terminal processor 1004 via a wireless channel depending on the result of the channel access procedure. Also, the transceiver outputs, to the terminal processor 1004, a signal received via a wireless channel, and transmits a signal output from the terminal processor 1004 via a wireless channel. The terminal processor 1004 may control a series of processes such that the terminal operates according to the above-described embodiments. For example, the terminal receiver 1002 may receive, from a base station, a signal including at least one piece of information from among uplink/downlink signal transmission interval length information, uplink/downlink scheduling information, and uplink/downlink channel occupancy time information transmitted from a downlink common control channel, and the terminal processor 1004 may perform control so as to determine the length of the uplink/downlink signal transmission interval configured in the configured uplink/downlink signal transmission/reception. Subsequently, the terminal transmitter 1006 may transmit a signal depending on the determined length of the uplink signal transmission interval.

Figure 11:
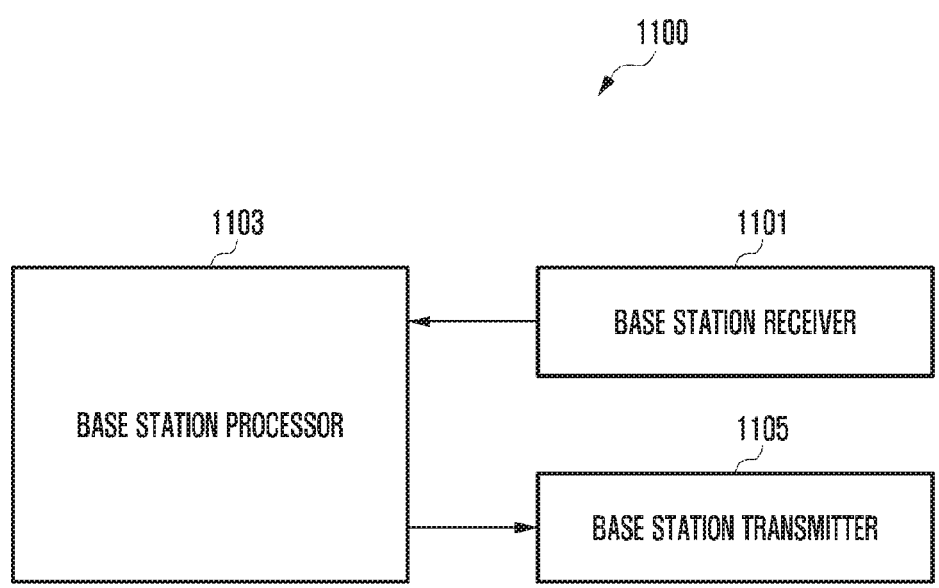
FIG. 11 is a block diagram illustrating the structure of a UE according embodiments.

FIG. 11 is a block diagram illustrating the structure of a base station according embodiments.

Referring to FIG. 11, a base station may include at least one of a base station receiver 1101, a base station transmitter 1105, and a base station processor 1103. The base station receiver 1101 and the base station transmitter 1105 are commonly called a transceiver in the embodiments of the disclosure. The transceiver may transmit or receive a signal to/from a terminal. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the base station processor 1103, a signal received via a wireless channel, and transmits a signal output from the base station processor 1103 via a wireless channel. The base station processor 1103 may control a series of processes such that the base station operates according to the above-described embodiments of the disclosure. For example, the base station processor 1103 may determine the length of an uplink/downlink transmission time interval, and may perform control so as to generate uplink/downlink scheduling information depending on the length of the uplink/downlink transmission time interval, to be transferred to the terminal. Subsequently, the base station transmitter 1105 may transfer, to a terminal, at least one piece of information from among the uplink/downlink transmission time interval, uplink/downlink scheduling information, and information transmitted from a downlink common channel, and the base station receiver 1101 may receive an uplink signal transmitted from the terminal at a configured timing. As another example, the base station processor 1103 configures one or more lengths of uplink/downlink transmission time intervals of a terminal, and configures configuration information including at least one piece of information from among uplink/downlink scheduling information based on the configured uplink/downlink transmission time interval length, an uplink/downlink transmission time interval length transmitted from a downlink common control channel, and/or uplink/downlink channel occupancy time information, and the base station transmitter 1105 transfers the configuration information associated with uplink transmission to the terminal.

Also, according to an embodiment, the base station processor 1103 may perform control so as to generate downlink control information (DCI) including second signal transmission timing information. In this instance, it is indicated that the DCI is the second signal transmission timing information.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, a terminal and a base station may operate according to a combination of parts of the embodiments of the disclosure. Also, although the embodiments have been described with reference to an NR system, other modifications of the embodiments made based on the technical idea of the embodiments may be applied to other systems, such as an FDD or TDD LTE system, or the like.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Also, parts of the embodiment may be used in combinations as necessary. For example, a UE and an eNB may operate according to the combination of the first embodiment and the second embodiment. Also, although the embodiments have been described with reference to an LTE system, other modifications of the embodiments made based on the technical idea of the embodiments may be applied to other systems, such as a 5G or NR system, or the like.

The invention claimed is:

1. A method performed by a terminal in a wireless communication system, the method comprising:
   receiving, from a base station, downlink control information (DCI) including uplink scheduling information for a plurality of subframes in an unlicensed band;
   identifying a start point and an end point of a duration for uplink transmission based on the uplink scheduling information; and
   transmitting, to the base station, the uplink transmission from the start point to the end point,
   wherein the uplink scheduling information configures a first duration of a starting subframe of the plurality of subframes and a second duration of a last subframe of the plurality of subframes, and
   wherein the start point is identified from a last symbol of the starting subframe based on the first duration, and the end point is identified from a first symbol of the last subframe based on the second duration.

2. The method of claim 1, wherein the second duration corresponds to starting 4 symbols or 7 symbols in the last subframe, and the first duration corresponds to last 7 symbols in the starting subframe.

3. The method of claim 1, wherein the DCI is received on a common search space in a downlink subframe of the unlicensed band.

4. A terminal in a wireless communication system, the terminal comprising:
   a transceiver configured to transmit and receive a signal; and a controller coupled with the transceiver and configured to;
receive, from a base station, downlink control information (DCI) including uplink scheduling information for a plurality of subframes in an unlicensed band,
identify a start point and an end point of a duration for uplink transmission based on the uplink scheduling information, and
transmit, to the base station, the uplink transmission from the start point to the end point,
wherein the uplink scheduling information configures a first duration of a starting subframe of the plurality of subframes and a second duration of a last subframe of the plurality of subframes, and
wherein the start point is identified from a last symbol of the starting subframe based on the first duration, and the end point is identified from a first symbol of the last subframe based on the second duration.

5. The terminal of claim 4, wherein the second duration corresponds to starting 4 symbols or 7 symbols in the last subframe, and the first duration corresponds to last 7 symbols in the starting subframe.

6. The terminal of claim 4, wherein the DCI is received on a common search space in a downlink subframe of the unlicensed band.

7. A method performed by a base station in a wireless communication system, the method comprising:
transmitting, to a terminal, downlink control information (DCI) including uplink scheduling information for a plurality of subframes in an unlicensed band; and
receiving, from the terminal, uplink transmission during a duration from a start point to an end point, wherein the start point and the end point are identified based on the uplink scheduling information,
wherein the uplink scheduling information configures a first duration of a starting subframe of the plurality of subframes and a second duration of a last subframe of the plurality of subframes, and
wherein the start point is identified from a last symbol of the starting subframe based on the first duration, and the end point is identified from a first symbol of the last subframe based on the second duration.

8. The method of claim 7, wherein the second duration corresponds to starting 4 or 7 symbols in the last subframe and the first duration corresponds to last 7 symbols in the starting subframe.

9. The method of claim 7, wherein the DCI is transmitted to the terminal on a common search space in a downlink subframe of the unlicensed band.

10. A base station in a wireless communication system, the base station comprising:
a transceiver configured to transmit and receive a signal; and
a controller coupled with the transceiver and configured to;
transmit, to a terminal, downlink control information (DCI) including uplink scheduling information for a plurality of subframes in an unlicensed band, and
receive, from the terminal, uplink transmission during a duration from a start point to an end point, wherein the start point and the end point are identified based on the uplink scheduling information,
wherein the uplink scheduling information configures a first duration of a starting subframe of the plurality of subframes and a second duration of a last subframe of the plurality of subframes, and
wherein the start point is identified from a last symbol of the starting subframe based on the first duration, and the end point is identified from a first symbol of the last subframe based on the second duration.

11. The base station of claim 10, wherein the second duration corresponds to starting 4 or 7 symbols in the last subframe, and the first duration corresponds to last 7 symbols in the starting subframe.

12. The base station of claim 10, wherein the DCI is transmitted to the terminal on a common search space in a downlink subframe of the unlicensed band.

* * * * *